(12) United States Patent
Lee

(10) Patent No.: US 9,641,717 B2
(45) Date of Patent: May 2, 2017

(54) IMAGE SCANNING APPARATUS AND IMAGE FORMING APPARATUS WITH REPOSITIONING AUXILIARY MEDIUM GUIDE FOR MIXED DOCUMENT WIDTHS

(71) Applicant: SAMSUNG ELECTRONICS CO., LTD., Suwon-si, Gyeonggi-do (KR)

(72) Inventor: Jung Hoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/056,125

(22) Filed: Feb. 29, 2016

(65) Prior Publication Data

US 2017/0041490 A1 Feb. 9, 2017

(30) Foreign Application Priority Data

Aug. 6, 2015 (KR) .......................... 10-2015-0111204

(51) Int. Cl.
*H04N 1/12* (2006.01)
*B65H 83/00* (2006.01)
(52) U.S. Cl.
CPC ............. *H04N 1/121* (2013.01); *B65H 83/00* (2013.01)
(58) Field of Classification Search
USPC .......... 271/3.01, 3.06, 3.08, 9.05, 9.06, 292
See application file for complete search history.

(56) References Cited

U.S. PATENT DOCUMENTS

| | | | |
|---|---|---|---|
| 5,251,889 A * | 10/1993 | Spencer | .................. B65H 1/04 |
| | | | 271/171 |
| 5,984,298 A | 11/1999 | Wada et al. | |
| 6,179,499 B1 | 1/2001 | Beretta et al. | |
| 2006/0243932 A1 | 11/2006 | Okubo et al. | |
| 2011/0096379 A1 | 4/2011 | Kurokawa | |

FOREIGN PATENT DOCUMENTS

| | | |
|---|---|---|
| JP | 11-249348 | 9/1999 |
| JP | 2001-139156 | 5/2001 |

OTHER PUBLICATIONS

European Search Report dated Dec. 22, 2016 from European Patent Application No. 16161268.4, 8 pages.

* cited by examiner

*Primary Examiner* — Barbara Reinier
(74) *Attorney, Agent, or Firm* — Staas & Halsey LLP

(57) ABSTRACT

An image scanning apparatus which reduces misalignment of documents includes a scanning unit configured to scan images from a first document and a second document having a width that is smaller than a width of the first document, and a document transfer unit configured to automatically feed the first document and the second document. The document transfer unit includes a frame including a feed tray on which the first document and the second document are stacked, a pickup module mounted on the frame, and configured to pick up the first document and the second document and to transfer the first document and the second document, and an auxiliary guide installed in the frame, and configured to change a position according to a height of the first document stacked on the feed tray and to support one side in width direction of the second document.

30 Claims, 24 Drawing Sheets

IMAGE SCANNING APPARATUS AND IMAGE FORMING APPARATUS WITH REPOSITIONING AUXILIARY MEDIUM GUIDE FOR MIXED DOCUMENT WIDTHS

CROSS-REFERENCE TO RELATED APPLICATIONS

This application claims the priority benefit of Korean Patent Application No. 10-2015-0111204, filed on Aug. 6, 2015 in the Korean Intellectual Property Office, the disclosure of which is incorporated herein by reference in its entirety.

BACKGROUND

1. Field

Embodiments of the disclosure relate to an image scanning apparatus for reading image information of a document, and an image forming apparatus having the same.

2. Description of the Related Art

In general, an image forming apparatus (for example, a multifunction printer) includes an image forming unit to form images on print medium, and an image scanning apparatus to read image information of documents.

The image scanning apparatus may include a scanning unit to scan an image from a document, and a document transfer unit rotatably installed above the scanning unit and configured to automatically feed a document that is to be scanned.

Recently, an image scanning apparatus including a first scanning member installed in a scanning unit and configured to scan an image of one side of a document, and a second scanning member installed in a document transfer unit and configured to scan an image of the other side of the document has been developed. The image scanning apparatus has an advantage of short scanning time, since it may scan image information of both sides of a document at nearly the same time by moving the document in a direction one time.

Also, an image scanning apparatus capable of picking up mixed documents of various widths has been developed. Examples of the mixed documents may include mixed documents of A3SEF documents and A4SEF documents, and mixed documents of 8.5" documents and 5.5" documents.

However, when a document is picked up from mixed documents of various sizes stacked on a feed tray, documents of a small size may be skewed since the movement guide of the feed tray guides documents based on documents of a large size.

SUMMARY

Therefore, it is an aspect of the disclosure to provide an image scanning apparatus capable of picking up a document without paper skew to scan the document when documents of various sizes are stacked on a feed tray, and an image forming apparatus having the image scanning apparatus.

Additional aspects of the disclosure will be set forth in part in the description which follows and, in part, will be apparent from the description, or may be learned by practice of the disclosure.

In accordance with an aspect of the disclosure, an image scanning apparatus may include: a scanning unit configured to scan images from a first document and a second document having a width that is smaller than a width of the first document, and a document transfer unit configured to automatically feed the first document and the second document The document transfer unit may include: a frame including a feed tray on which the first document and the second document are stacked, a pickup module mounted on the frame, and configured to pick up the first document and the second document and to transfer the first document and the second document, and an auxiliary guide installed in the frame, and configured to change a position according to a height of the first document stacked on the feed tray and to support one side in width direction of the second document.

The frame may further include a pickup module housing configured to protect the pickup module, and the auxiliary guide may be installed in the pickup module housing provided in the frame to be positioned in front of the pickup module.

The document transfer unit may further include a rail member extending in a width direction of the feed tray, and the auxiliary guide may be movably installed on the rail member.

The rail member may include a fixing member configured to fix the auxiliary guide at a position corresponding to the width of the second document.

The document transfer unit may further include an auxiliary guide transfer apparatus configured to automatically transfer the auxiliary guide to a position corresponding to one side in width direction of the second document.

The auxiliary guide may include a support member supported on the frame, a guide arm configured to support one side in width direction of the second document, and a rotating shaft configured to connect the support member to the guide arm such that a rotation angle of the guide arm changes according to the height of the first document.

At least one surface of the auxiliary guide may have a round shape in order to prevent the second document from being jammed.

The document transfer unit may further include an additional auxiliary guide installed in the frame to be positioned in front of the pickup module, and configured to support one side in width direction of a third document having a width that is smaller than the width of the second document.

The auxiliary guide may change a rotation angle such that the auxiliary guide is placed on the surface of the first document.

In accordance with an aspect of the disclosure, an image forming apparatus may include: an image scanning apparatus configured to receive a document, and to scan an image of the document, and an image forming unit configured to form the scanned image on print medium, wherein the image scanning apparatus includes: a scanning unit configured to scan images from a first document and a second document having a width that is smaller than a width of the first document, and a document transfer unit configured to automatically feed the first document and the second document. The document transfer unit may include: a frame including a feed tray on which the first document and the second document are stacked, a pickup module installed in the frame, and configured to pick up the first document and the second document and to transfer the first document and the second document, and an auxiliary guide installed in the frame, and configured to change a position according to a height of the first document stacked on the feed tray, and to support one side in width direction of the second document.

In accordance with an aspect of the disclosure, an image scanning apparatus may include: a scanning unit configured to scan images from a first document and a second document having a width that is smaller than a width of the first document, and a document transfer unit to automatically feed the first document and the second document. The document transfer unit may include: a frame including a feed tray on which the first document and the second document are stacked, a cover unit rotatably coupled with the frame, and configured to be opened or closed, a pickup module installed in the cover unit, and configured to pick up the first document and the second document, and to transfer the first document and the second document, and an auxiliary guide installed in the cover unit, and configured to change a position according to a height of the first document stacked on the feed tray, and to support one side in width direction of the second document.

The cover unit may further include a rail member at the lower part, and the auxiliary guide may be installed on the rail member, and move in a width direction of the feed tray along the rail member.

The rail member may include a fixing member configured to fix the auxiliary guide at a position corresponding to the width of the second document.

The document transfer unit may further include an auxiliary guide transfer apparatus configured to automatically transfer the auxiliary guide to a position corresponding to one side in width direction of the second document.

The auxiliary guide may include a support member supported on the cover unit, a guide arm configured to support one side in width direction of the second document, and a rotating shaft configured to connect the support member to the guide arm such that a rotation angle of the guide arm changes according to the height of the first document.

At least one surface of the auxiliary guide may have a round shape in order to prevent the second document from being jammed.

The document transfer unit may further include an additional auxiliary guide installed in the cover unit to be positioned in front of the pickup module, and configured to support one side in width direction of a third document having a width that is smaller than the width of the second document.

The auxiliary guide may be placed on the surface of the first document to change a rotation angle according to the height of the first document.

The cover unit may further include a rail cover member configured to prevent the auxiliary guide from departing from the rail member.

In accordance with an aspect of the disclosure, an image forming apparatus may include: an image scanning apparatus configured to receive a document, and to scan an image of the document, and an image forming unit configured to form the scanned image on print medium. The image scanning apparatus may include: a scanning unit configured to scan images from a first document and a second document having a width that is smaller than a width of the first document, and a document transfer unit configured to automatically feed the first document and the second document. The document transfer unit may include: a frame including a feed tray on which the first document and the second document are stacked, a cover unit rotatably coupled with the frame, and configured to be opened or closed, a pickup module installed in the cover unit, and configured to pick up the first document and the second document, and to transfer the first document and the second document, and an auxiliary guide installed in the cover unit, and configured to change a position according to the height of the first document stacked on the feed tray, and to support one side in width direction of the second document.

In accordance with an aspect of the disclosure, an image scanning apparatus may include: a frame including a feed tray on which a first document and a second document having a width that is smaller than a width of the first document are stacked, a cover unit rotatably coupled with the frame, a pickup module installed in one of the frame and the cover unit, and configured to pick up a document stacked on the feed tray, and to transfer the document, a scanning unit configured to scan an image from the document transferred from the pickup module, and at least one auxiliary guide installed in one of the frame and the cover unit, configured to change a position according to a height of the first document stacked on the feed tray, and having a guide arm to support one side in width direction of the second document.

The image scanning apparatus may further include a rail member installed in the one of the frame and the cover unit, wherein the at least one auxiliary guide may be movable along the rail member.

The at least one auxiliary guide may include a plurality of auxiliary guides arranged in a width direction of the feed tray.

The image scanning apparatus may further include an auxiliary guide transfer apparatus configured to move the at least one auxiliary guide in a width direction of the feed tray.

The guide arm may be placed on the surface of the first document stacked on the feed tray, and rotate according to the height of the first document.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
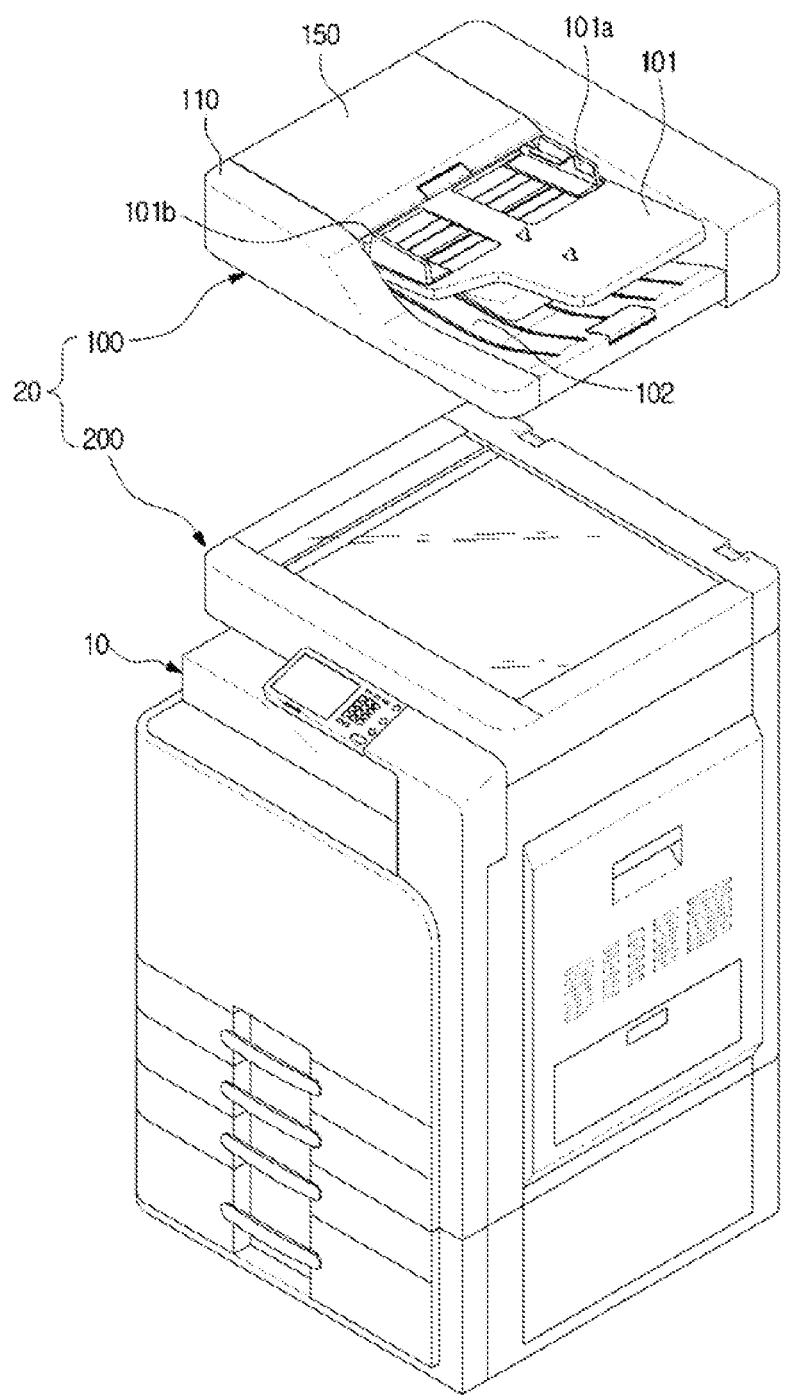
FIG. 1 is a perspective view of an image forming apparatus according to an embodiment of the disclosure.

Reference will now be made in detail to the embodiments, examples of which are illustrated in the accompanying drawings, wherein like reference numerals refer to like elements throughout. The embodiments are described below to explain the disclosure by referring to the figures.

Hereinafter, configurations and operations of an image scanning apparatus and an image forming apparatus having the same will be described in detail through embodiments shown in the accompanying drawings.

Terms used in this specification will be briefly described, and the disclosure will be described in detail.

Although general terms being widely used and understood by one of ordinary of skill in the art have been selected as terminology used in the disclosure while considering the functions of the disclosure, the terms may vary according to intentions of one of ordinary skill in the art, judicial precedents, the advent of new technologies, and the like. Terms arbitrarily selected by the applicant of the disclosure may also be used in a specific case. In this case, their meanings will be given in the detailed description of the disclosure. Hence, the terms must be defined based on the meanings of the terms and the contents of the entire specification, not by simply stating the terms themselves.

It will be understood that when the terms "includes," "comprises," "including," and/or "comprising," when used in this specification, specify the presence of stated elements and/or components, but do not preclude the presence or addition of one or more elements and/or components thereof. As used herein, the terms "part", "module", or "unit" refers to a unit that may perform at least one function or operation, and may be implemented as a software or hardware or as a combination of software and hardware.

It will be understood that, although the terms first, second, etc. may be used herein to describe various components, these components should not be limited by these terms. These terms are only used to distinguish one component from another.

Hereinafter, embodiments of the disclosure will be described in detail with reference to the accompanying drawings such that one of ordinary skill in the art may make and use the disclosure. However, the disclosure is not limited to the embodiments described in this specification, and may be implemented in different forms. Also, in the drawings, parts irrelevant to descriptions will be omitted in order to clearly describe the disclosure, and throughout this specification, like reference numerals will be understood to refer to like components.

Hereinafter, an image forming apparatus (for example, a multifunction printer) according to an embodiment of the disclosure will be described in detail with reference to the accompanying drawings.

Referring to FIG. 1, the image forming apparatus may include an image forming unit 10 configured to form an image on print medium, and an image scanning apparatus 20 disposed above the image forming unit 10 and configured to scan a document.

The image scanning apparatus 20 may include a scanning unit 200 to scan an image from a document, and a document transfer unit 100 rotatably mounted above the scanning unit 200 and configured to automatically feed a document that is to be scanned.

The document transfer unit 100 may be a fixed document pickup type or an open document pickup type. In the document transfer unit 100 of the fixed document pickup type, a pickup roller which picks up a document is fixed at a frame, which may ensure the performance of stably picking up a document. Meanwhile, in the document transfer unit 100 of the open document pickup type, a pickup roller which picks up a document is fixed at a cover, which may easily remove a jammed document.

Figure 2:
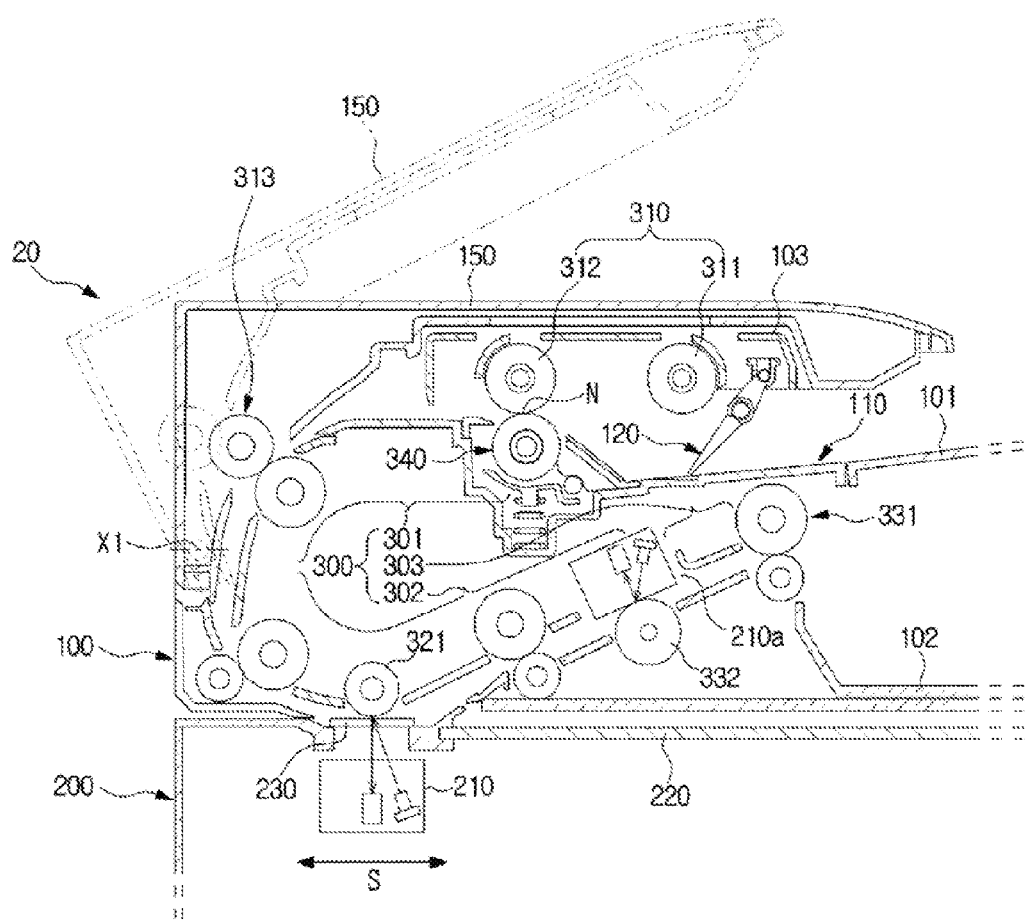
FIGS. 2 and 3 are cross-sectional views of an image scanning apparatus that is applied to an image forming apparatus according to an embodiment of the disclosure.
Figure 3:
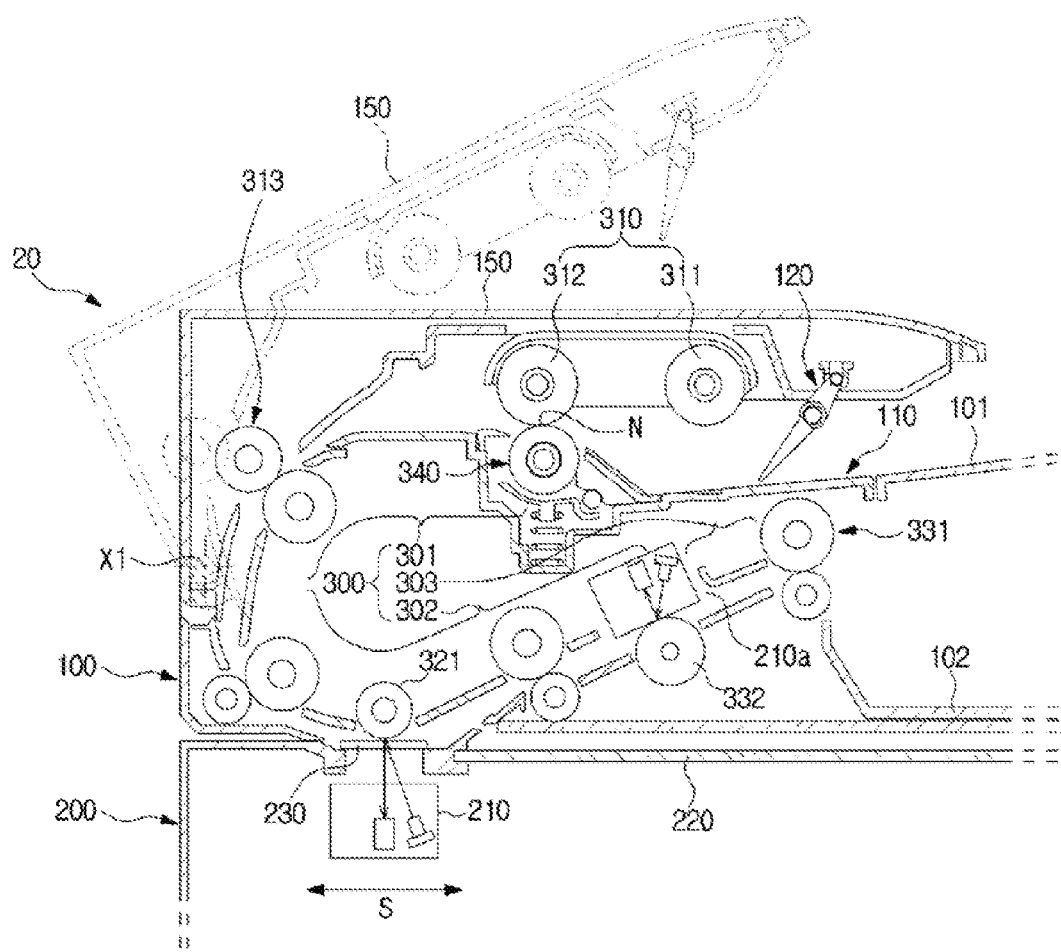
Figure 4:
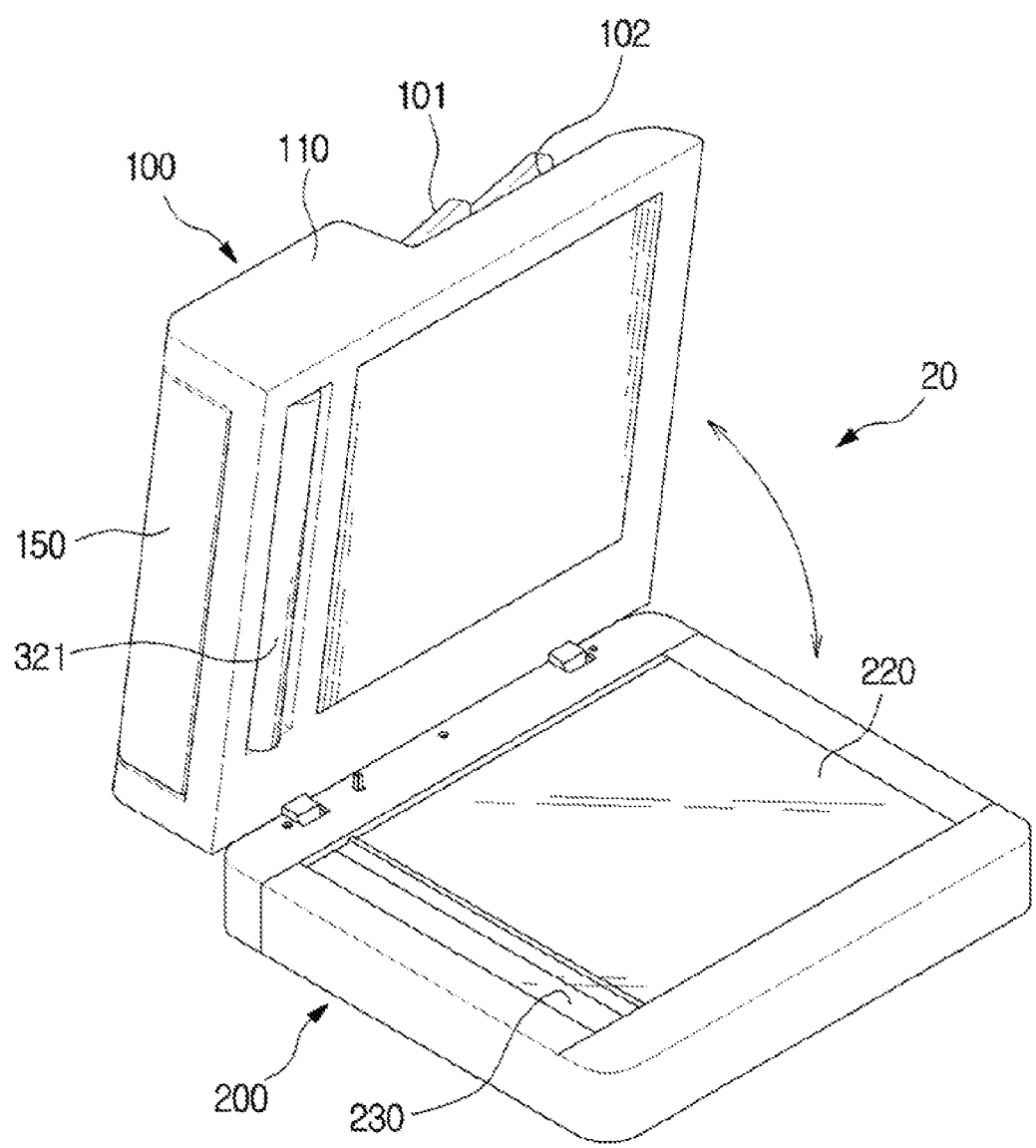
FIG. 4 is a perspective view of an image scanning apparatus according to an embodiment of the disclosure.

FIGS. 2 and 3 are schematic cross-sectional views of the image scanning apparatus 20. More specifically, FIG. 2 shows the image scanning apparatus 20 having the document transfer unit 100 of the fixed document pickup type, and FIG. 3 shows the image scanning apparatus 20 having the document transfer unit 100 of the open document pickup type. Also, FIG. 4 is a schematic perspective view of the image scanning apparatus 20 when the document transfer unit 100 opens.

Referring to FIGS. 2 and 3, the scanning unit 200 may include a scanning member 210 to scan an image from a document. The scanning member 210 may irradiate light on a document, and receive light reflected from the document to thus scan an image of the document. The scanning member 210 may be, for example, a Contact Type Image Sensor (CIS) or a Charge Coupled Device (CCD).

The scanning unit 200 may include a platen glass 220 on which a document is placed to scan an image from the document in a flat-bed method. Also, the scanning unit 200 may include a scanning window 230 to scan an image from a document in a document transfer method. The scanning window 230 may be, for example, a transparent member. For example, the upper surface of the scanning window 230 may be on a level with the upper surface of the platen glass 220.

When the document transfer method is applied, the scanning member 210 may be located below the scanning window 230. When the flat-bed method is applied, the scanning member 210 may be moved in a sub-scanning direction S, that is, in the length direction of a document by moving means (not shown) below the platen glass 210. Also, when the flat-bed method is applied, the platen glass 220 may be exposed to the outside in order for a user to be able to place a document on the platen glass 220.

The document transfer unit 100 may transfer a document in order for the scanning member 210 to be able to read an image of the document, and may discharge the scanned document. For this, the document transfer unit 100 may include a feed tray 101, a frame 110, and a cover unit 150 rotatably coupled with the frame 110 (for example about a hinge axis X1). The frame 110 may include a discharge tray 102.

In the document transfer unit 100, a document transfer path may be provided, and the scanning member 210 may read an image from a transferred document. The document transfer path 300 may include, for example, a feed path 301, a scanning path 302, and a discharge path 303. The scanning member 210 may be disposed on the scanning path 302, and when a document passes through the scanning path 302, an image written on the document may be read by the scanning member 210. The feed path 301 may feed documents to the scanning path 302, and documents stacked on the feed tray 101 may be fed to the scanning path 302 through the feed path 301. The discharge path 303 may discharge the documents passed through the scanning path 302. Accordingly, documents stacked on the feed tray 101 may be transferred along the feed path 301, the scanning path 302, and the discharge path 303, and then discharged to the discharge tray 102.

In order to scan both sides of a document at once, the document transfer unit 100 may include an additional scanning member 210a. In this case, the scanning member 210 installed in the scanning unit 200 may scan an image of the front side of a document, and the scanning member 210a installed in the document transfer unit 100 may scan an image of the rear side of the document. The scanning member 210a may be located downstream from the scanning member 210, in the transfer direction of a document.

However, a structure for scanning both sides of a document is not limited to the example. For example, instead of using the additional scanning member 210a, an inversion path may be provided to overturn a document and scan the rear side of the document through the scanning member 210. However, the image scanning apparatus 20 may include no configuration for scanning both sides of a document, as necessary.

On the document transfer path 300, a plurality of document transfer rollers may be arranged to transfer a document. For example, on the feed path 301, a pickup module 310 configured to pick up one of documents stacked on the feed tray 101 and to transfer the picked-up document, a friction module 340 that is opposite to the pickup module 310, and a feed roller 313 disposed downstream from the pickup module 310 may be provided.

The pickup module 310 may include a pickup roller 311 configured to pick up one of documents stacked on the feed tray 101, and a forward roller 312 located adjacent to the pickup roller 311 and configured to transfer the picked-up document. The pickup roller 311 and the forward roller 312 may be interlocked. For example, the pickup roller 311 and the forward roller 312 may be connected to each other through a belt (not shown).

Meanwhile, in the document transfer unit 100 of the fixed document pickup type as shown in FIG. 2, the pickup module 310 may be coupled with and installed in a pickup module housing 103 for protecting the pickup module 310, and the pickup module housing 103 may be included in the frame 110. However, in the document transfer unit 100 of the open document pickup type as shown in FIG. 3, the pickup module 310 may be fixedly installed in the cover unit 150 that is rotatable with respect to the frame 110. In this case, if the cover unit 150 is rotated and opened, the pickup module 310 installed in the cover unit 150 may be separated from the frame 110.

The friction module 340 may be opposite to the pickup module 310 to form a nip N. The friction module 340 may provide a friction force to the rear surface of a document passing through the nip N, in a direction that is opposite to the transfer direction of the document. For example, the friction module 340 may rotate in a direction that is opposite to the feeding direction of a document, or may not rotate at a predetermined torque or less. When two documents or more are fed between the friction module 340 and the forward roller 312, one of the documents may be separated and fed to the feed roller 313 due to a difference in friction force. For example, when a plurality of documents are fed between the friction module 340 and the forward roller 312, a friction force between the documents may be smaller than a friction force between the forward roller 312 and the document contacting the forward roller 312 and a friction force between the friction module 340 and the document contacting the friction module 340. Accordingly, the document contacting the forward roller 312 may slide on the underlying document to be separated from the underlying document, and then be transferred toward the feed roller 313. However, the friction module 340 and the pickup module 310 are not limited to the exemplary structures shown in FIGS. 2 and 3, and may have any other known structures.

On the scanning path 302, a plurality of transfer rollers 321 and 332 may be arranged to transfer a document to be opposite to the scanning members 210 and 210a. For example, the transfer roller 321 may rotate while being elastically pressed by the scanning window 230 of the scanning unit 200 to transfer a document that is fed between the transfer roller 321 and the scanning window 230. The transfer roller 332 may rotate with respect to the scanning member 210a, and transfer a document that is fed between the transfer roller 332 and the scanning member 210a.

On the discharge path 303, a discharge roller 331 may be provided to discharge a scanned document. The discharge roller 331 may include a driving roller and a driven roller that are engaged with each other and rotate.

Although not shown in the drawings, one or more sensors for sensing a document may be disposed on the feed path 301, the scanning path 302, and the discharge path 303.

The feed tray 101 may be formed to have a first width corresponding to a first document to be scanned. In an embodiment, the width of the feed tray 101 may be the length of the feed tray 101 in a direction that is vertical to the transfer direction of documents. The feed tray 101 may include a pair of movement guides 101a and 101b configured to support both sides in width direction of stacked documents, and a guide slot formed in the width direction of the feed tray 101 and configured to guide movements of the movement guides 101a and 101b. Also, although not shown in the drawings, the pair of movement guides 101a and 101b may be respectively connected to two racks provided at both ends of a pinion so as to move together with the two racks.

On the feed tray 101, first documents and second documents having a width that is smaller than that of the first documents may be mixed and stacked. For example, the first documents may be A3SEF documents, and the second documents may be A4SEF documents. Also, the first documents may be 8.5"LEF documents, and the second documents may be 5.5"SEF documents. A case in which one kind of documents of the first documents and the second documents are stacked is referred to as a state in which general documents are stacked, and a case in which the first documents and the second documents are mixed and stacked is referred to as a state in which mixed documents are stacked.

If the movement guides 101a and 101b of the feed tray 101 are adjusted to support both sides in the width direction of the first documents in the state in which mixed documents are stacked, the second documents having the width that is smaller than that of the first documents may be supported at one sides in the width direction by the movement guide 101a, or may be not supported at any of the sides in the width direction by the movement guides 101a and 101b. In this case, if the pickup module 310 picks up one of the second documents of the stacked documents, the second document having the smaller width than the first documents may be skewed since it is not supported at any side thereof. In the disclosure, this phenomenon is referred to as paper skew. If paper skew occurs, a problem in which the document is damaged or a part of an image written on the document is cut or damaged may be generated. For this reason, auxiliary guides for guiding the second documents having the smaller width than the first documents are needed.

Figure 5:
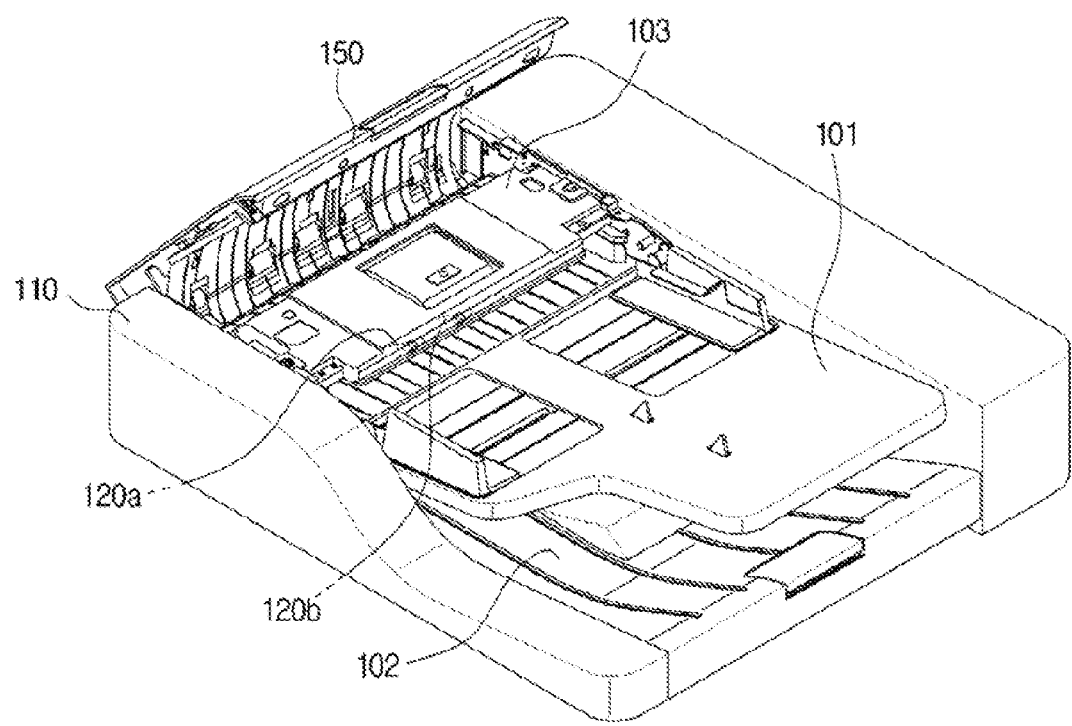
FIG. 5 is a perspective view of a document transfer unit of a fixed document pickup type in which auxiliary guides are installed, according to an embodiment of the disclosure.

FIG. 5 is a perspective view of the document transfer unit 100 of the fixed document pickup type in which auxiliary guides 120a and 120b (also, referred to as a first auxiliary guide 120a and a second auxiliary guide 120b) are installed, according to an embodiment of the disclosure.

As shown in FIG. 5, the auxiliary guides 120a and 120b may be located in the lower part of the pickup module housing 103 for protecting the pickup module 310. The auxiliary guides 120a and 120b may support one side in a width direction of various kinds of documents. For example, the first auxiliary guide 120a may support one side in a width direction of A3SEF documents, and the second auxiliary guide 120b may support one side in a width direction of A4SEF documents.

Figure 6:
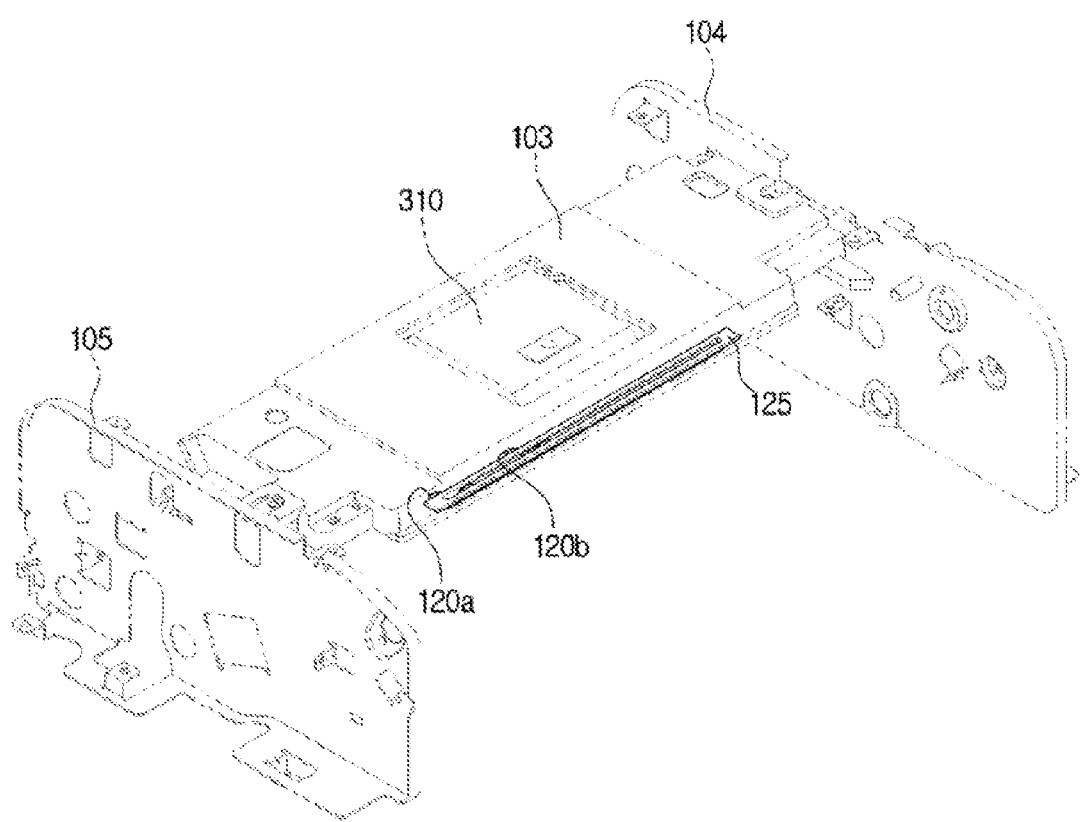
FIGS. 6 and 7 are perspective views of a pickup module housing in which auxiliary guides are installed.
Figure 7:
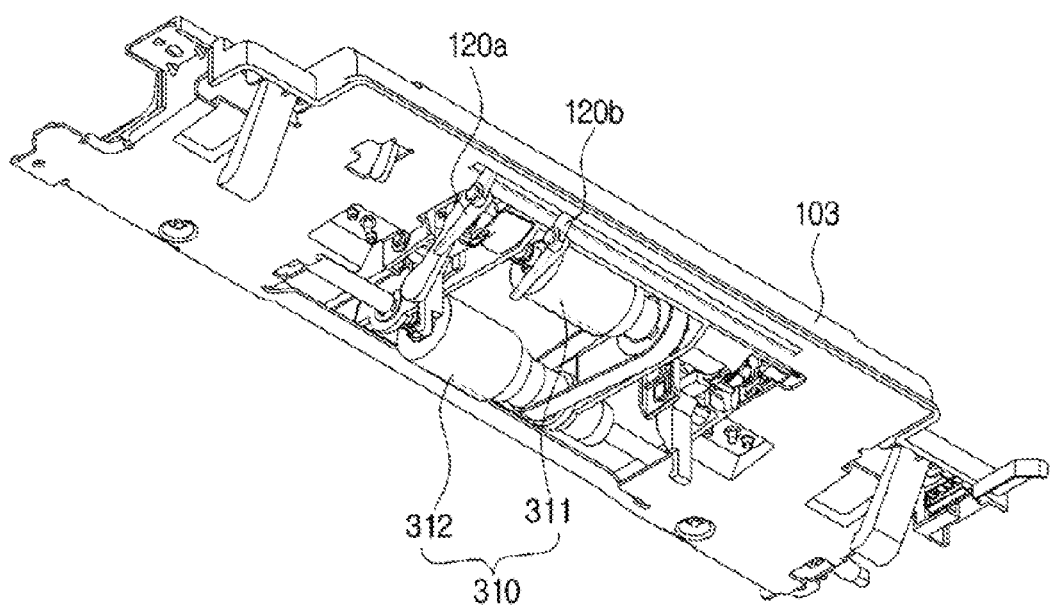

FIGS. 6 and 7 are perspective views of the pickup module housing 103 in which the auxiliary guides 120a and 120b are installed, according to an embodiment of the disclosure.

FIG. 6 is a perspective view of the pickup module housing 103 in which the auxiliary guides 120a and 120b are installed, when seen from above, and FIG. 7 is a perspective view of the pickup module housing 103 in which the auxiliary guides 120a and 120b are installed, when seen from below.

As shown in FIGS. 6 and 7, the pickup module housing 103 for protecting the pickup module 310 may be positioned between a rear frame 104 and a front frame 105 to be installed in the frame 110.

The auxiliary guides 120a and 120b may be coupled with a rail member 125 aligned in the width direction of the feed tray 101 in the lower part of the pickup module housing 103. The auxiliary guides 120a and 120b may move in the width direction of the feed tray 101 along the rail member 125. For example, the auxiliary guides 120a and 120b may be moved along the rail member 125 by a user's manipulation. Alternatively, if information about kinds of mixed documents to be scanned is input by a user, or a mixed mode is selected by a user, the auxiliary guides 120a and 120b may be automatically moved along the rail member 125 by automatic transfer means which will be described later.

Figure 8:
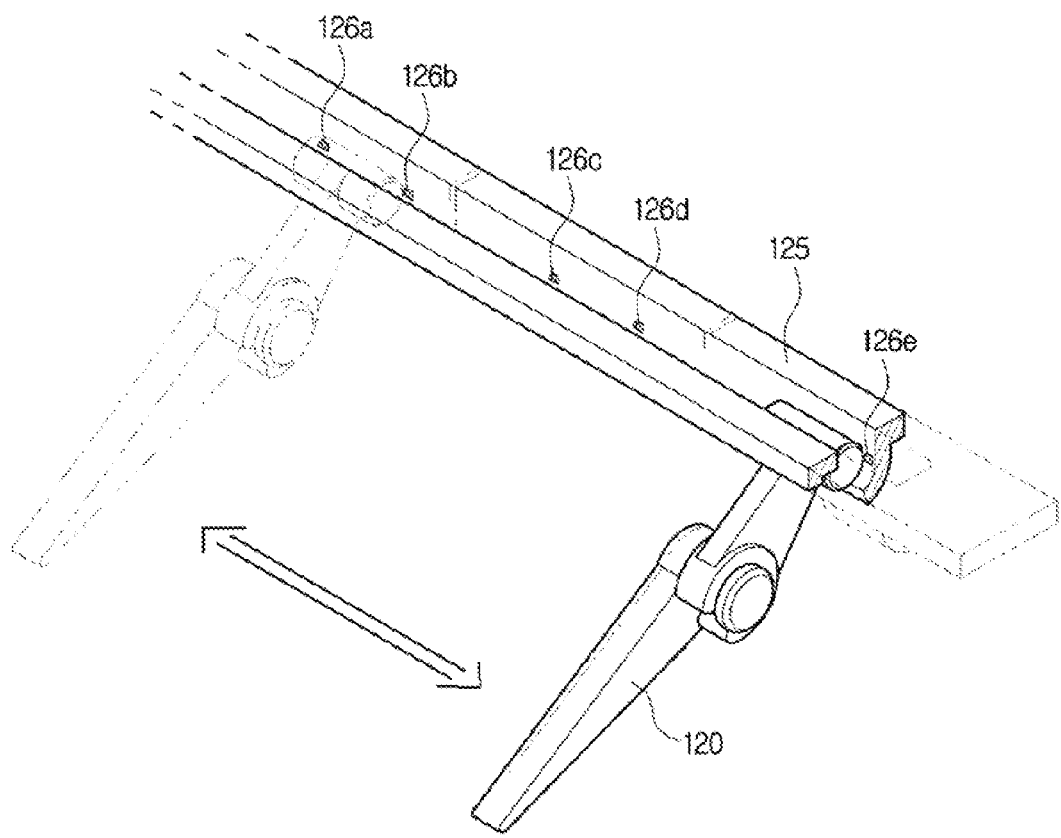
FIG. 8 is a perspective view of a rail member in which an auxiliary guide is installed, according to an embodiment of the disclosure.

FIG. 8 is a perspective view of the rail member 125 in which an auxiliary guide 120 is installed, according to an embodiment of the disclosure.

As shown in FIG. 8, the auxiliary guide 120 may be moved to the left/right in the width direction of documents along the groove of the rail member 125. On the rail member 125, a plurality of fixing members 126a, 126b, 126c, 126d, and 126e may be formed in the shapes of protrusions to fix the position of the auxiliary guide 120. The fixing members 126a to 126e may prevent the auxiliary guide 120 from moving to the left/right due to an impact generated when a document is picked up or rested. The fixing members 126a to 126e may be arranged to correspond to the widths of various kinds of documents, on the rail member 125. For example, if a force exceeding a predetermined force is applied to the auxiliary guide 120 positioned between the fixing members 126a and 126b by a user, the auxiliary guide 120 may depart from the position between the fixing members 126a and 126b, and move to be positioned between the other fixing members 126c and 126d.

Figure 9:
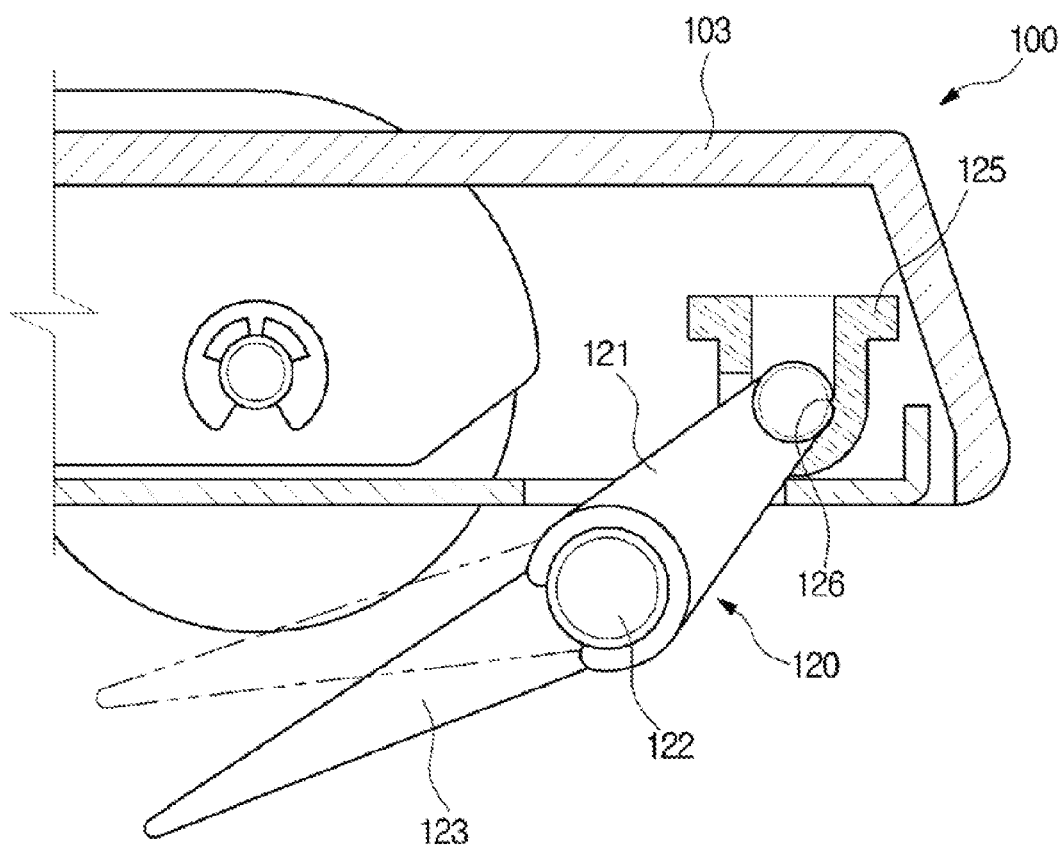
FIG. 9 is a side view of an auxiliary guide installed in a document transfer unit of a fixed document pickup type, according to an embodiment of the disclosure.

FIG. 9 is a side view of the auxiliary guide 120 installed in the document transfer unit 100 of the fixed document pickup type, according to an embodiment of the disclosure.

As shown in FIG. 9, the auxiliary guide 120 may include a support member 121, a guide arm 123, and a rotating shaft 122 to connect the support member 121 to the guide arm 123. The support member 121 may be fixed by a fixing member 126 at a position corresponding to the width of documents, on the rail member 125. The guide arm 123 may rotate by a predetermined angle with respect to the rotating shaft 122, wherein the angle of the guide arm 123 may change according to the height of the first documents having the wider width than the second documents among mixed documents.

Figure 10:
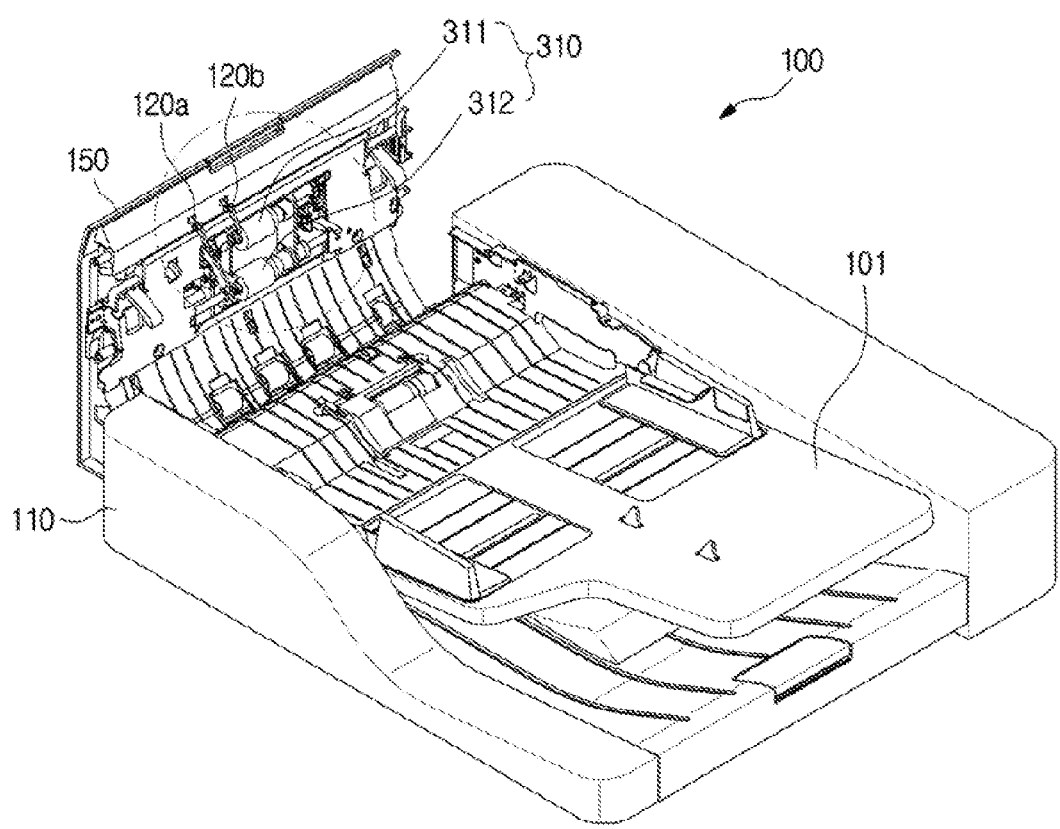
FIG. 10 is a perspective view of a document transfer unit of an open document pickup type in which auxiliary guides are installed, according to an embodiment of the disclosure.

FIG. 10 is a perspective view of the document transfer unit 100 of the open document pickup type in which the auxiliary guides 120a and 120b are installed, according to an embodiment of the disclosure.

As shown in FIG. 10, the auxiliary guides 120a and 120b may be fixed at the cover unit 150 to be positioned in front of the pickup module 310. The auxiliary guides 120a and 120b may be provided as a plurality of pieces in order to support documents of various widths. For example, the first auxiliary guide 120a may be an auxiliary guide for supporting A3SEF documents, and the second auxiliary guide 120b may be an auxiliary guide for supporting A4SEF documents.

Figure 11:
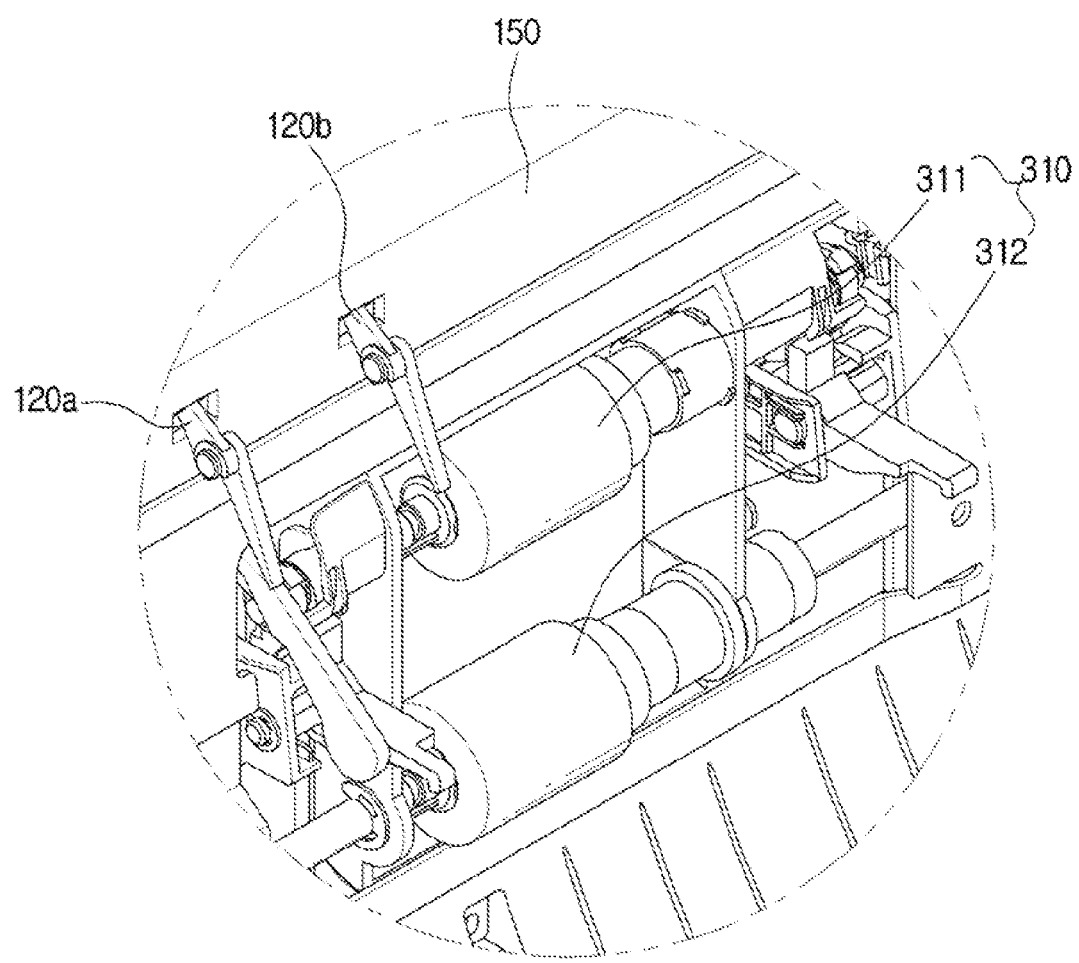
FIG. 11 is a perspective view of a cover unit in which auxiliary guides are installed, according to an embodiment of the disclosure.

FIG. 11 is a perspective view of the cover unit 150 in which the auxiliary guides 120a and 120b are installed, according to an embodiment of the disclosure.

As shown in FIG. 11, the auxiliary guides 120a and 120b may be located at positions corresponding to the widths of documents, in the lower part of the cover unit 150. The auxiliary guides 120a and 120b may be located at positions to support one side in a width direction of various kinds of documents. More specifically, the auxiliary guides 120a and 120b may be positioned in consideration of the widths of mixed documents that are often used or mixed documents that often cause paper skew. Examples of the mixed documents that often cause paper skew may be A3SEF documents and A4SEF documents, and B4SEF documents and B5SEF documents. In this case, the auxiliary guides 120a and 120b may be installed in the cover unit 150 to be fixed at a position corresponding to the width of A4SEF documents and at a position corresponding to the width of A5SEF documents.

Figure 12:
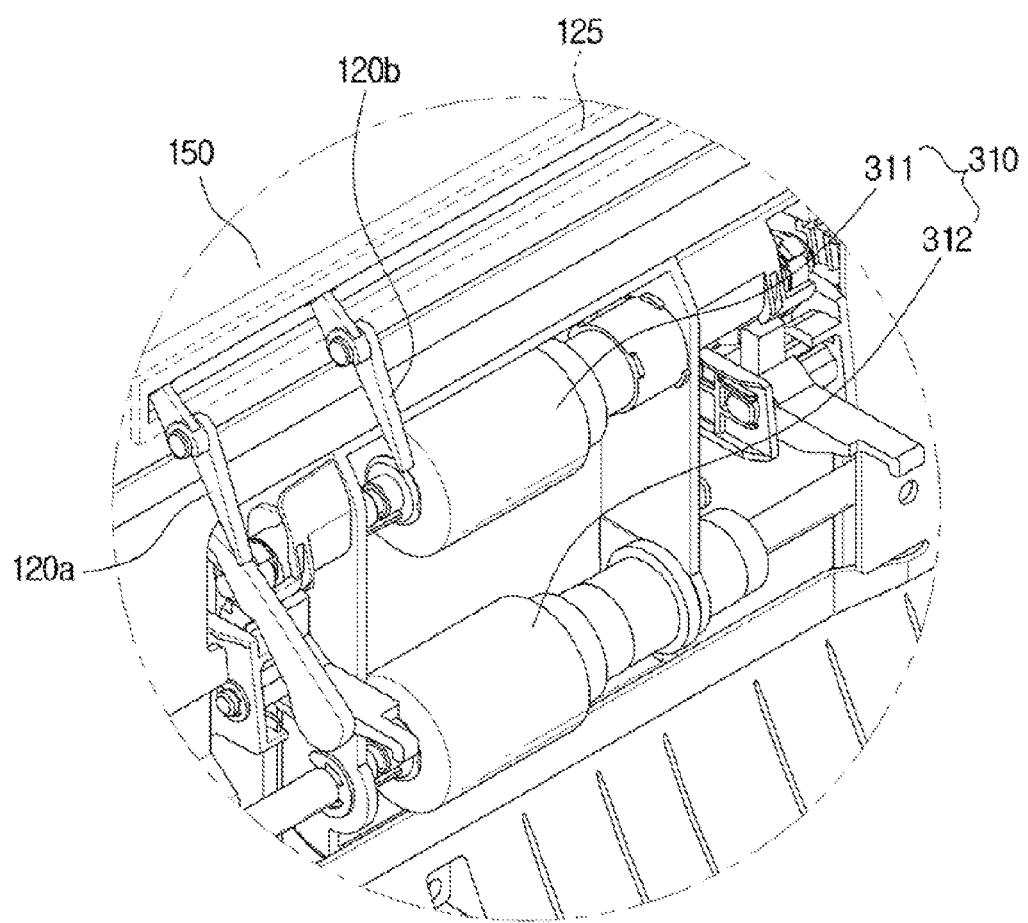
FIG. 12 is a perspective view of a cover unit including a rail member in which auxiliary guides are installed.

FIG. 12 is a perspective view of the cover unit 150 including the rail member 125 in which the auxiliary guides 120a and 120b are installed, according to an embodiment of the disclosure.

As shown in FIG. 12, the rail member 125 may be disposed in the lower part of the cover unit 150. The rail member 125 may be, for example, in the shape of the rail member 125 installed in the pickup module housing 130, as described above with reference to FIG. 8. The auxiliary guides 120a and 120b may move in the width direction of the feed tray 101 along the rail member 125. For example, a user may open the cover unit 150 to move the auxiliary guides 120a and 120b in the width direction of the feed tray 101 along the rail member 125. On the rail member 125, a plurality of fixing members (not shown) may be formed in the shapes of protrusions to fix the positions of the auxiliary guides 120a and 120b. The fixing members may be arranged to correspond to the widths of various kinds of documents, on the rail member 125.

Figure 13:
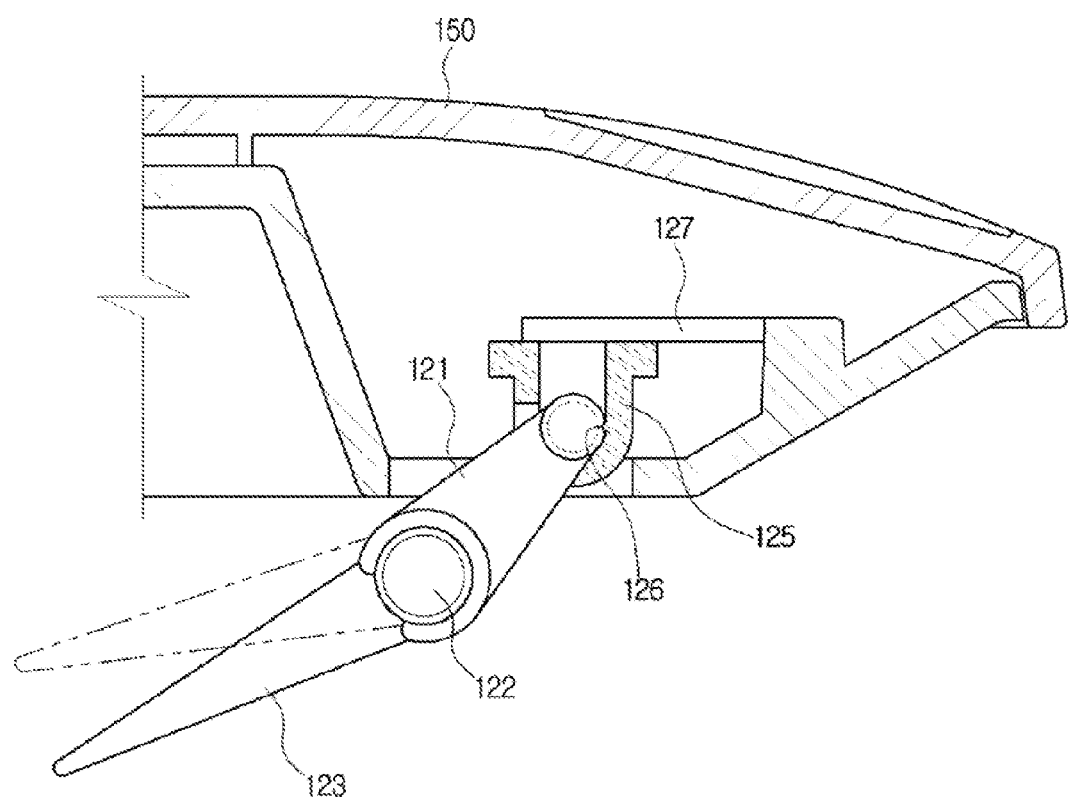
FIG. 13 is a side view of an auxiliary guide installed in a document transfer unit of an open document pickup type, according to an embodiment of the disclosure.

FIG. 13 is a side view of the auxiliary guide 120 installed in the document transfer unit 100 of the open document pickup type, according to an embodiment of the disclosure.

As shown in FIG. 13, the auxiliary guide 120 may include a support member 121, a guide arm 123, and a rotating shaft 122 to connect the support member 121 to the guide arm 123. The support member 121 may be fixed at a position corresponding to the width of documents by a fixing member 126, on the rail member 125. The guide arm 123 may rotate by a predetermined angle with respect to the rotating shaft 122, wherein the angle of the guide arm 123 may change according to the height of the first documents having the wider width than the second documents among mixed documents.

The cover unit 150 may further include a rail cover member 127 configured to prevent, when the cover unit 150 opens, the auxiliary guide 120 from departing from the rail member 125.

Figure 14:
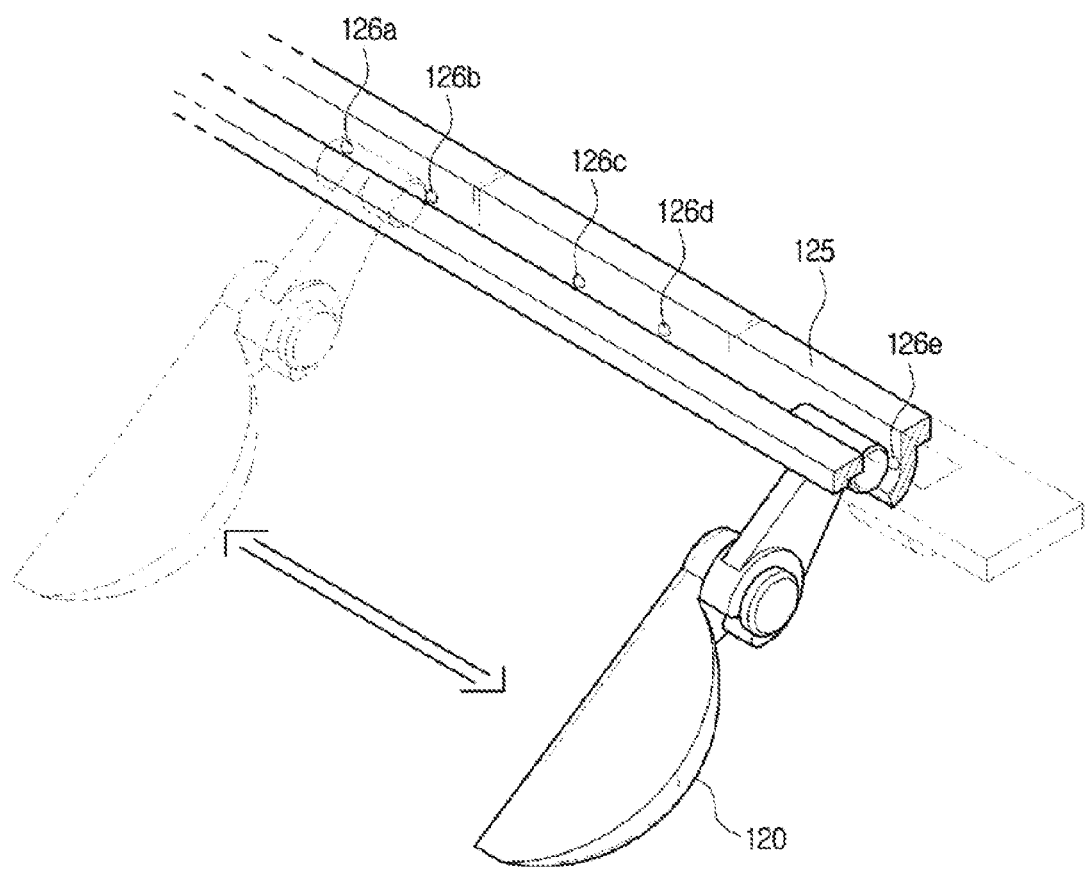
FIGS. 14 and 15 show an auxiliary guide having a round shape according to an embodiment of the disclosure.
Figure 15:
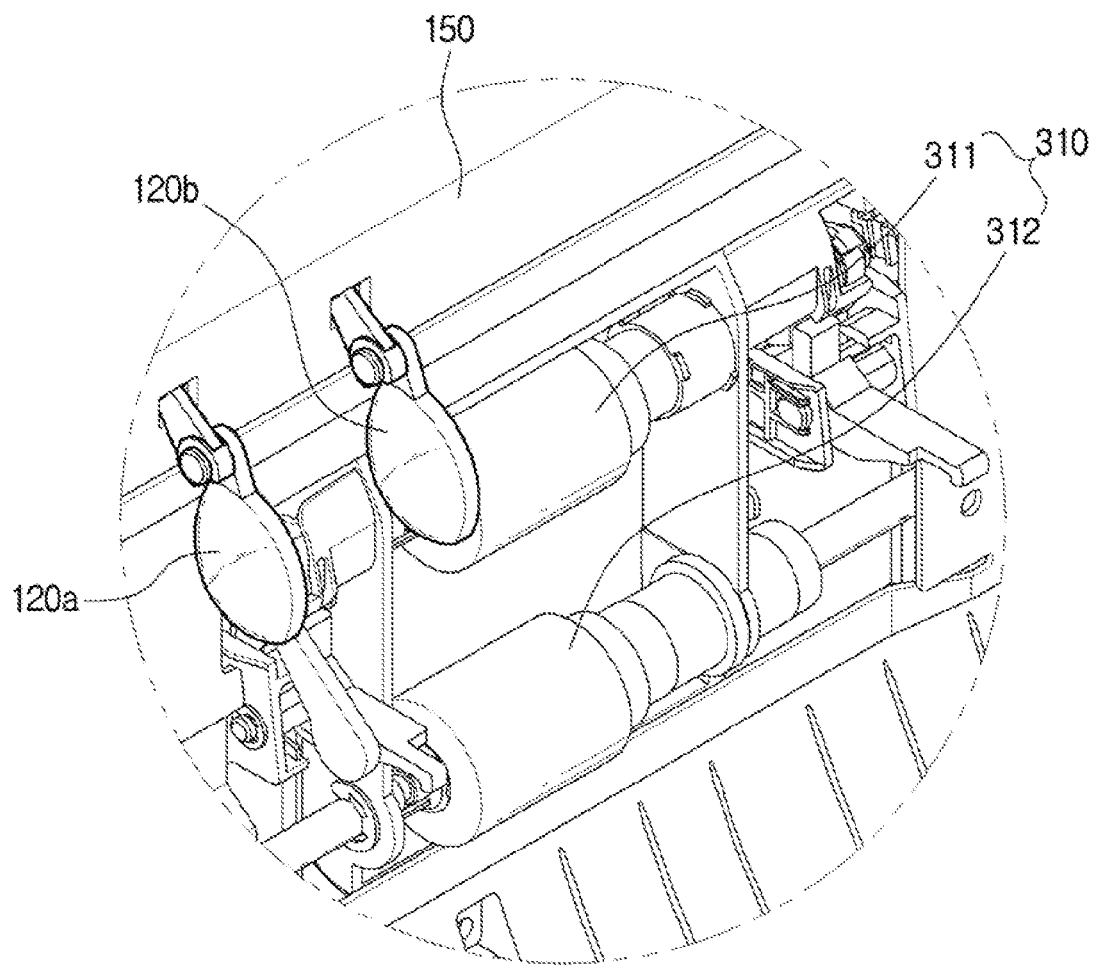

FIGS. 14 and 15 show an auxiliary guide having a round shape according to an embodiment of the disclosure.

Figure 16:
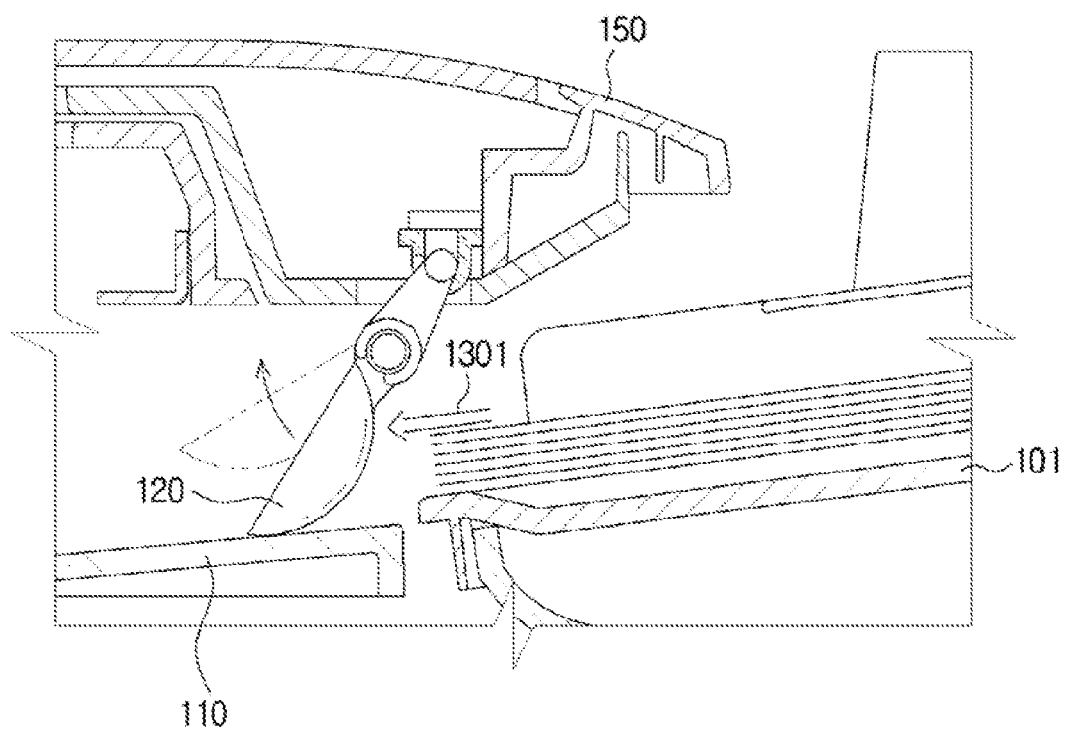
FIG. 16 shows a case in which a document is transferred in a leading direction when an auxiliary guide of a round shape is installed.
Figure 17:
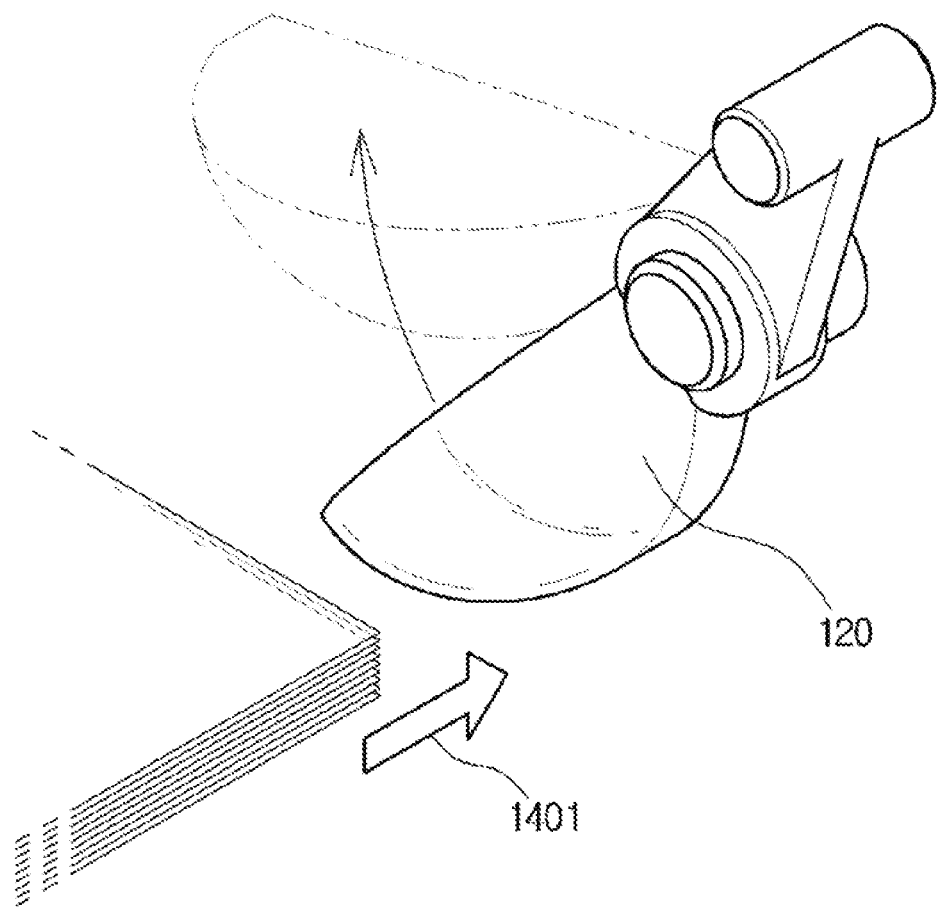
FIG. 17 shows a case in which a document is transferred in a width direction when an auxiliary guide of a round shape is installed.

FIG. 14 shows an auxiliary guide 120 of a round shape installed on the rail member 125, and FIG. 15 shows auxiliary guides 120a and 120b of a round shape installed in the cover unit 150. Also, FIG. 16 shows a case in which a document is transferred to a leading direction when an auxiliary guide 120 of a round shape is installed, and FIG. 17 shows a case in which a document is transferred in the width direction when the auxiliary guide 120 of the round shape is installed.

In FIG. 14, the auxiliary guide 120 of the round (or oval) shape may be installed on the rail member 125 to move to the left/right in the width direction of documents along the groove of the rail member 125. The rail member 125 on which the auxiliary guide 120 of the round shape is installed may be disposed in the lower part of the pickup module housing 103 to be positioned in front of the pickup module 310. Alternatively, the rail member 125 may be disposed in the lower part of the cover unit 150 to be positioned in front of the pickup module 310. Meanwhile, as shown in FIG. 15, the auxiliary guide 120 of the round shape may be fixed at the cover unit 150 to be positioned in front of the pickup module 310.

When the auxiliary guides 120a and 120b of the round shape are used, jams that may occur when the pickup module 310 picks up a document from the feed tray 101 or when documents are stacked on the feed tray 101 may be significantly prevented. For example, as shown in FIG. 16, when a document is transferred to the leading direction to be picked up, a paper jam may be prevented due to the round shape of the auxiliary guide 120 formed in a direction 1301 in which the document is transferred. Also, if documents closely contact the auxiliary guide 120 in the width direction of the documents when the documents are stacked on the feed tray 101, a paper jam may be prevented due to the round shape of the auxiliary guide 120 formed in a direction 1401 in which the documents are transferred. As shown in FIGS. 14, 16, and 17 the auxiliary guide 120 may be formed to have a semi-circular or semi-oval shape.

Figure 18:
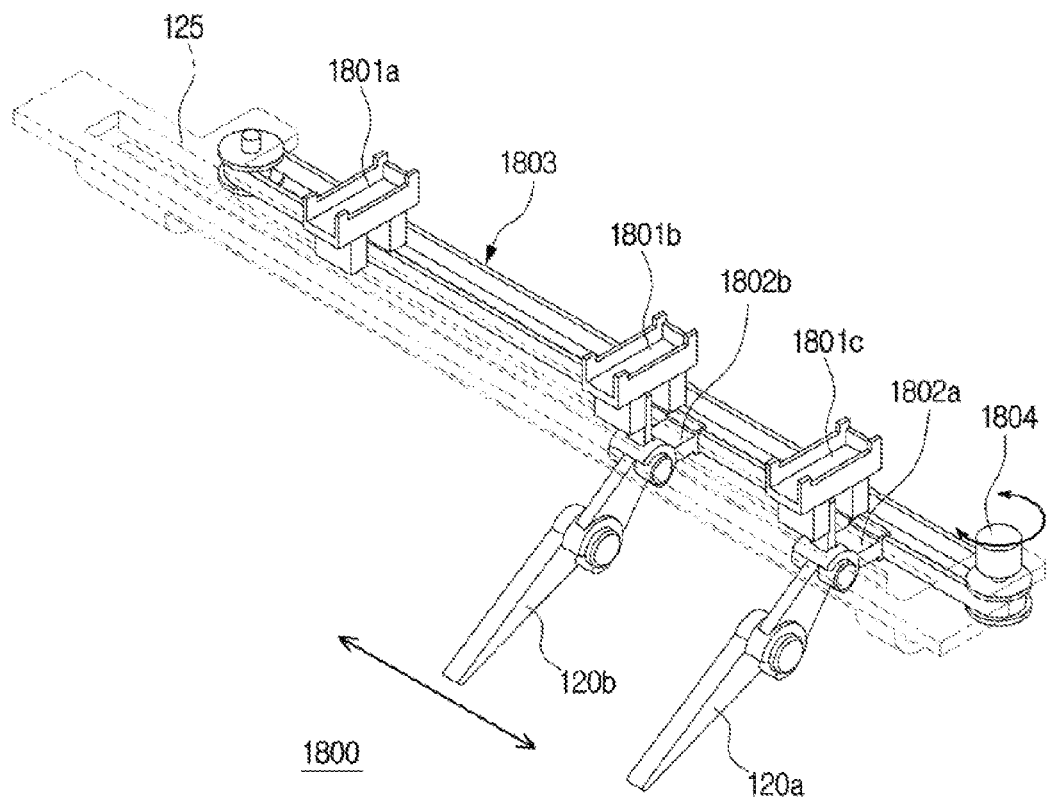
FIG. 18 is a perspective view of an auxiliary guide transfer apparatus that is coupled with a rail member, according to an embodiment of the disclosure.

FIG. 18 is a perspective view of an auxiliary guide transfer apparatus 1800 that is coupled with a rail member, according to an embodiment of the disclosure.

As shown in FIG. 18, the auxiliary guide transfer apparatus 1800 to automatically transfer the auxiliary guides 120a and 120b to positions corresponding to one side in a width direction of documents stacked on the feed tray 101 may be further coupled with the rail member 125.

The auxiliary guide transfer apparatus 1800 may include a plurality of sensor members 1801a, 1801b, and 1801c, a plurality of clip members 1802a and 1802b connected to the auxiliary guides 120a and 120b, a transfer member 1803 configured to transfer the clip members 1802a and 1802b for transferring the auxiliary guides 120a and 120b, and a driving member 1804 configured to move the transfer member 1803 along a predetermined route.

The sensor members 1801a, 1801b, and 1801c may be positioned on the rail member 125 to be fixed at positions corresponding to the widths of various kinds of documents. The sensor members 1801a, 1801b, and 1801c may sense movement of the auxiliary guides 120a and 120b passing through the gaps between the sensor members 1801a, 1801b, and 1801c. For example, each of the sensor members 1801a, 1801b, and 1801c may include a light emitting unit to emit infrared light toward a gap, and a light receiving unit to receive infrared light from the other gap. In this case, the sensor members 1801a, 1801b, and 1801c may determine whether the auxiliary guides 120a and 120b are located in the gaps between the sensor members 1801a, 1801b, and 1801c, according to whether infrared light is blocked.

If the positions of the auxiliary guides 120a and 120b are sensed by the sensor members 1801a, 1801b, and 1801c, the driving member 1804 may determine whether to continue to move the transfer member 1803 along the predetermined route or whether to stop moving the transfer member 1803 along the predetermined route, in consideration of kinds of mixed documents set by a user. That is, it may be determined whether to move the auxiliary guides 120a and 120b located in the gaps of the sensor members 1801a, 1801b, and 1801c, in correspondence to the widths of mixed documents. Accordingly, since the auxiliary guides 120a and 120b are automatically moved without the need for a user to adjust the positions of the auxiliary guides 120a and 120b whenever the kinds of mixed documents change, a user's convenience may be improved.

Figure 19:
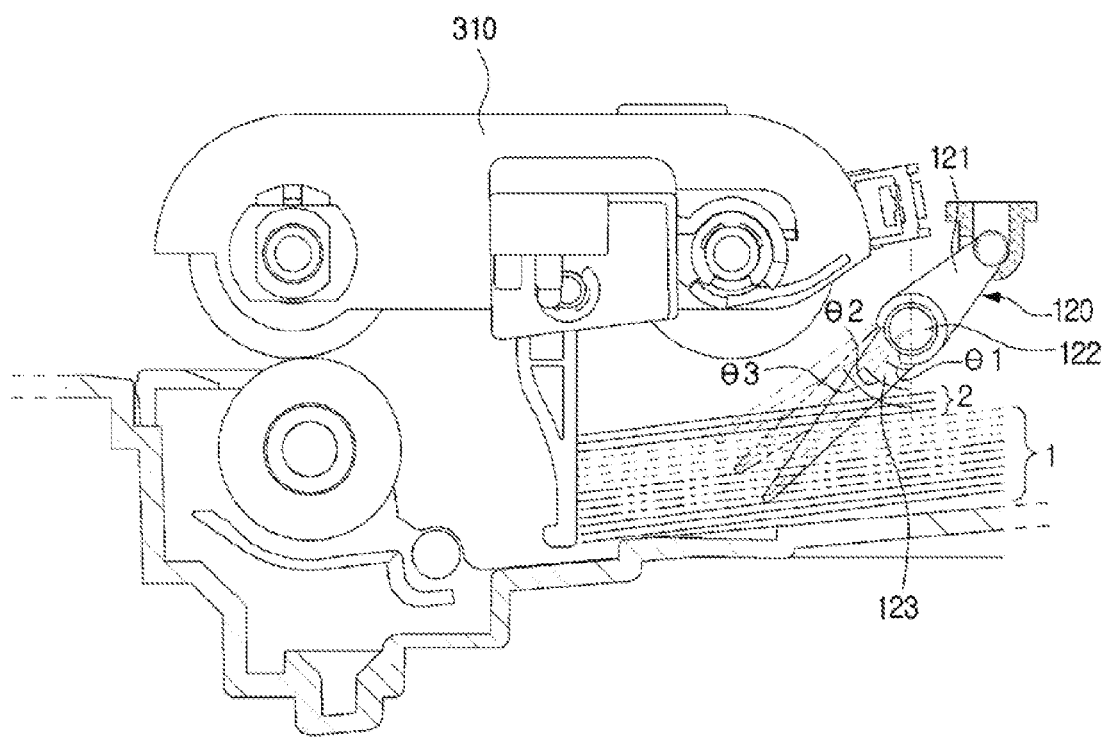
FIG. 19 is a side view of an auxiliary guide when mixed documents are stacked, according to an embodiment of the disclosure.

FIG. 19 is a side view of the auxiliary guide 120 when mixed documents are stacked, according to an embodiment of the disclosure.

As shown in FIG. 19, first documents 1 and second documents 2 that are smaller than the first documents 1 may be mixed and stacked on the feed tray 101. The auxiliary guide 120 may be positioned to support one side of a second document 2 in a width direction of the second documents 2. The end of the auxiliary guide 120 may be placed on the surface of the first documents 1, at a position corresponding to one side in a width direction of the second documents 2, by its own weight.

In this case, the auxiliary guide 120 may have an angle of θ1, θ2, or θ3 according to the height of the first documents 1. For example, the guide arm 123 of the auxiliary guide 120 may change its angle on the rotating shaft 122 according to the height of the first documents 1 to be placed on the surface of the first documents 1. Accordingly, the sides of the second documents 2 may be guided by the auxiliary guide 120. Also, when the height of the stacked first documents 1 is lowered according to feeding of the first documents 1, the guide arm 123 of the auxiliary guide 120 may change its angle on the rotating shaft 122 by its own weight to be rested on the surface of the first documents 1. Accordingly, even when the first documents 1 are fed, the second documents 2 may continue to be guided at the sides by the auxiliary guide 120.

Figure 20:
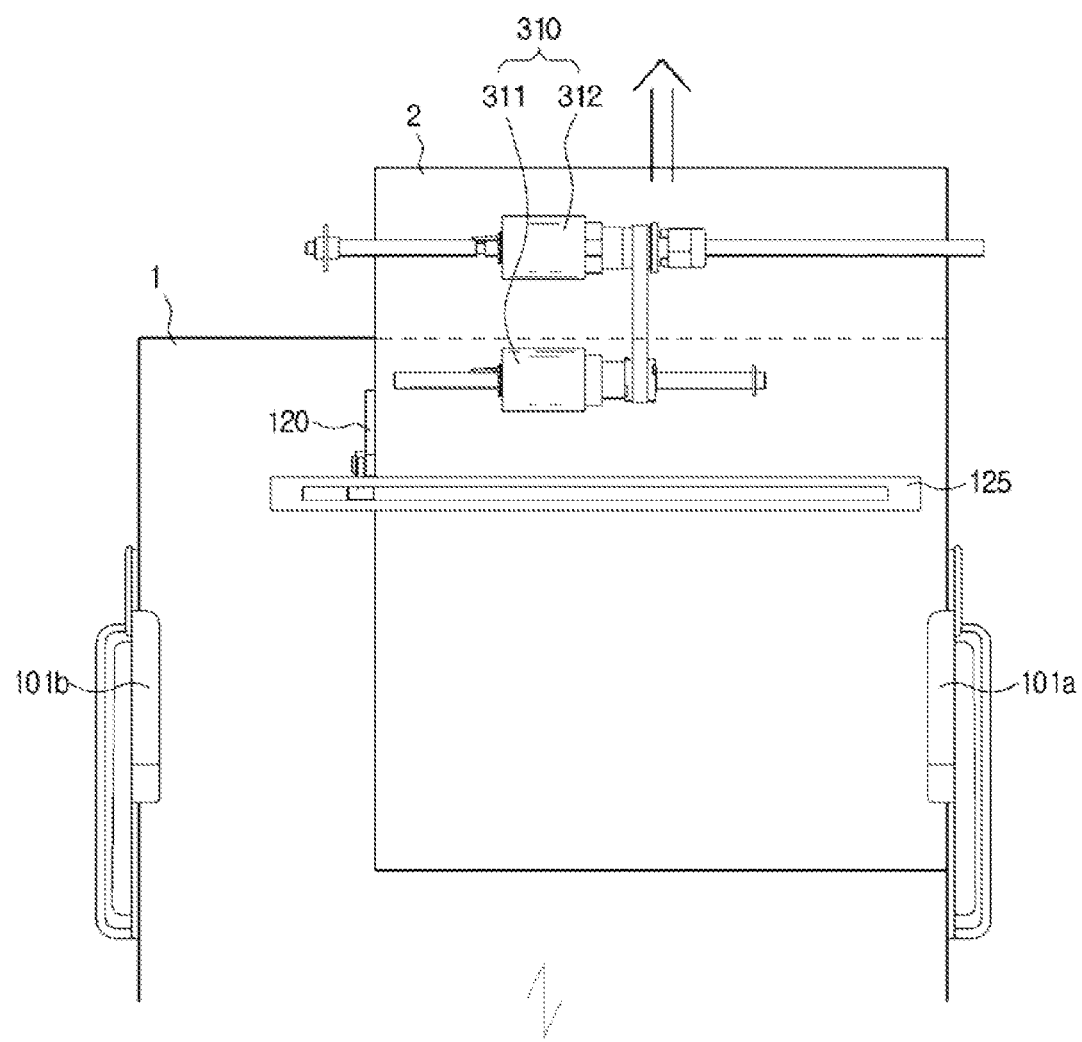
FIG. 20 is a top view of an auxiliary guide when mixed documents are stacked, according to an embodiment of the disclosure.

FIG. 20 is a top view of the auxiliary guide 120 when mixed documents are stacked, according to an embodiment of the disclosure.

As shown in FIG. 20, first documents 1 and second documents 2 having a width that is smaller than that of the first documents 1 may be mixed and stacked on the feed tray 101. In this case, both sides in a width direction of the first documents 1 may be supported by the movement guides 101a and 101b provided in the width direction of the feed tray 101. Also, one side in a width direction of the second documents 2 having the smaller width than the first documents 1 may be supported by one movement guide 101a of the feed tray 101, and the other side in a width direction of the second documents 2 may be supported by the auxiliary guide 120 provided on the rail member 125.

Generally, when the pickup roller 311 departs from the center of documents, there is high probability that paper skew will occur. However, according to the disclosure, although the pickup roller 311 departs from the center of documents, both sides of the documents may be supported by the auxiliary guide 120 and at least one of the movement guides 101a and 101b, which lowers the generation probability of paper skew.

Figure 21:
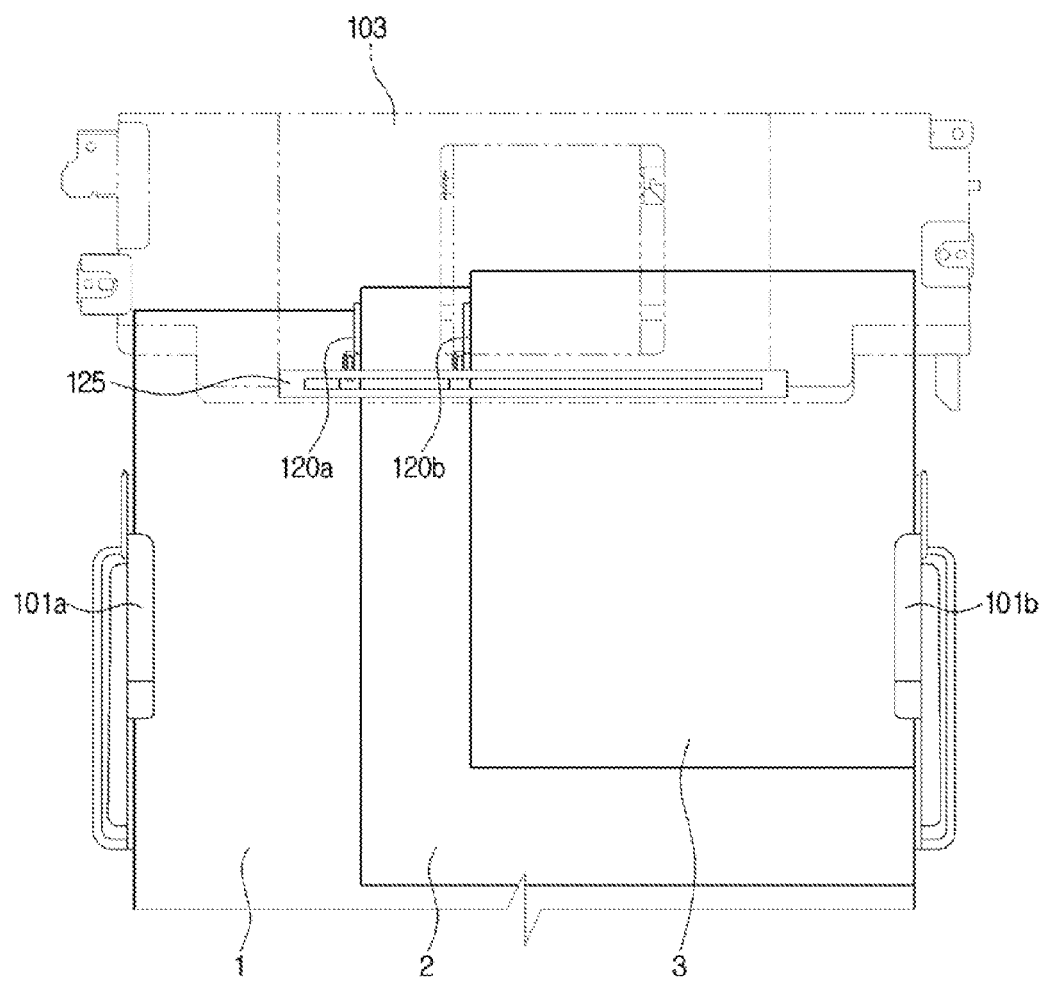
FIGS. 21 and 22 show auxiliary guides when mixed documents are stacked.
Figure 22:
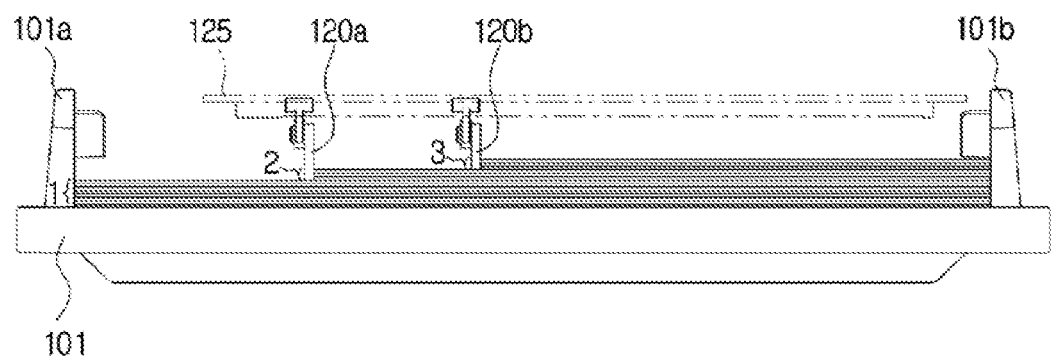

FIGS. 21 and 22 show the auxiliary guides 120a and 120b when mixed documents are stacked, according to an embodiment of the disclosure.

As shown in FIGS. 21 and 22, three or more kinds of documents 1, 2, and 3 may be mixed and stacked on the feed tray 101. FIG. 20 is a plan view showing the auxiliary guides 120a and 120b installed on the rail member 125 when three kinds of mixed documents 1, 2, and 3 are stacked on the feed tray 101, and FIG. 21 is a rear view showing the auxiliary guides 120a and 120b installed on the rail member 125 when three kinds of mixed documents 1, 2, and 3 are stacked on the feed tray 101.

As shown in FIGS. 21 and 22, the width of the first documents 1 may be wider than that of the second documents 2, and the width of the second documents 2 may be wider than that of the third documents 3. In this case, both sides in a width direction of the first documents 1 may be supported by the movement guides 101a and 101b of the feed tray 101. Also, both sides in a width direction of the second documents 2 may be supported by the movement guide 101b of the feed tray 101 and the first auxiliary guide 120a. Also, both sides in a width direction of the third documents 3 may be supported by the movement guide 101b of the feed tray 101 and the second auxiliary guide 120b.

Generally, when a user scans mixed documents, the user may classify the mixed documents according to the sizes of the documents, and then scan the classified documents individually. However, if a user uses the auxiliary guide 120 according to the disclosure after stacking mixed documents on the feed tray 101 in such a way to place documents of a smaller size on documents of a larger size, it is possible to rapidly and easily scan the mixed documents while minimizing paper skew.

Also, when a user scans general documents, the user may move the auxiliary guide 120 to a position corresponding to the width of the general documents although the general documents are not properly supported by the movement guides 101a and 101b of the feed tray 101, thereby scanning the general documents while minimizing paper skew.

Also, according to the disclosure, the user may move the auxiliary guide 120 along the rail member 125 so as to support documents of various sizes through the auxiliary guide 120. More specifically, the fixing members 126 formed in the shapes of protrusions on the rail member 125 may prevent the auxiliary guide 120 from departing from its position.

Figure 23:
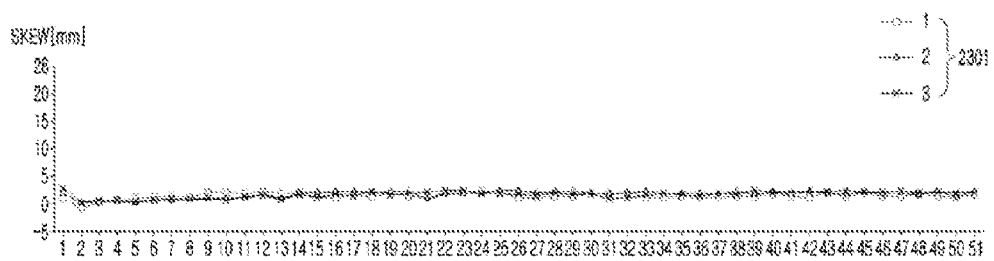
FIGS. 23 and 24 are graphs showing degrees of paper skew when an auxiliary guide according to the disclosure is applied and when the auxiliary guide is not applied.
Figure 24:
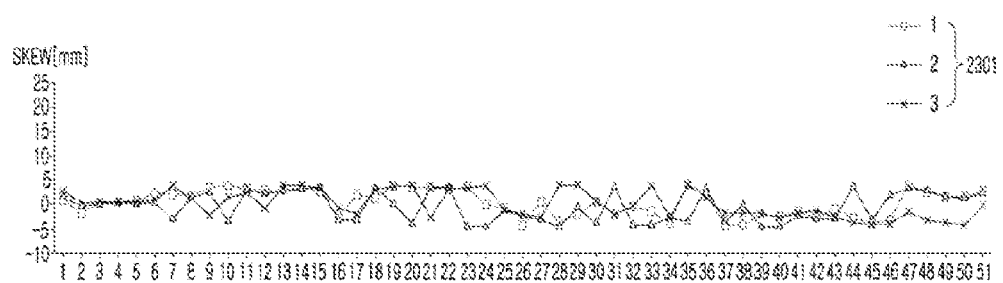

FIGS. 23 and 24 are graphs showing degrees of paper skew when the auxiliary guide 120 according to the disclosure is applied and when the auxiliary guide 120 is not applied.

In FIGS. 23 and 24, the x axis represents the number of tests for measuring paper skew, and the y axis represents a degree of paper skew by millimeters, at which a paper is skewed when paper skew occurs. The degree of paper skew may represent a distance to the left or right top of a skewed document from the left or right top of a non-skewed document. Also, examples 1, 2, and 3 (2301) represent different image scanning apparatuses 20.

FIG. 23 shows a degree of paper skew appearing in the image scanning apparatus 20 in which the auxiliary guide 120 is installed, and FIG. 24 shows a degree of paper skew appearing in the image scanning apparatus in which no auxiliary guide 120 is installed. As seen in FIG. 23, the degree of paper skew appearing in the image scanning apparatus 20 in which the auxiliary guide 120 is installed is 3 mm or less on average. Meanwhile, as seen in FIG. 24, the degree of paper skew appearing in the image scanning apparatus 20 in which no auxiliary guide 120 is installed is 5 mm or less on average. It will be understood from FIGS. 23 and 24 that when the auxiliary guide 120 is installed, paper skew is significantly reduced.

According to an aspect of the disclosure, the image scanning apparatus and the multifunction printer having the same may use the auxiliary guide when scanning mixed documents of various sizes stacked on the feed tray, thereby reducing a phenomenon in which documents of a small size are skewed.

Also, according to an aspect of the disclosure, the image scanning apparatus and the multifunction printer having the same may provide components for moving the auxiliary guide in consideration of the widths of documents, thereby enabling the use of documents of various sizes.

Although embodiments of the disclosure have been shown and described, it would be appreciated by those skilled in the art that changes may be made to these embodiments without departing from the principles and spirit of the disclosure, the scope of which is defined in the claims and their equivalents.

What is claimed is:

1. An image scanning apparatus, comprising:
   a scanning unit configured to scan a first document and a second document, the second document having a width that is smaller than a width of the first document; and
   a document transfer unit configured to automatically feed the first document and the second document,
   wherein the document transfer unit comprises:
      a frame including a feed tray on which the first document and the second document are to be stacked;
      a pickup module installed on the frame, and configured to pick up the first document and the second document from the feed tray; and
      an auxiliary guide configured to change a position according to a height of the first document stacked on the feed tray and to support one side of the second document in a width direction of the second document.

2. The image scanning apparatus according to claim 1, wherein
   the frame further comprises a pickup module housing configured to protect the pickup module, and
   the auxiliary guide is installed on the pickup module housing provided to the frame and is positioned in front of the pickup module.

3. The image scanning apparatus according to claim 1, wherein
the document transfer unit further comprises a rail member extending in a width direction of the feed tray, and
the auxiliary guide is movably installed on the rail member.

4. The image scanning apparatus according to claim 3, wherein the rail member comprises at least one fixing member configured to fix the auxiliary guide at a position corresponding to the width of the second document.

5. The image scanning apparatus according to claim 1, wherein the document transfer unit further comprises an auxiliary guide transfer apparatus configured to automatically transfer the auxiliary guide to a position corresponding to the one side of the second document.

6. The image scanning apparatus according to claim 1, wherein the auxiliary guide comprises:
a support member supported on the frame,
a guide arm configured to support the one side of the second document, and
a rotating shaft configured to connect the support member to the guide arm and to change a rotation angle of the guide arm according to the height of the first document.

7. The image scanning apparatus according to claim 1, wherein at least one surface of the auxiliary guide has a round shape to prevent the second document from being jammed.

8. The image scanning apparatus according to claim 1, wherein
the document transfer unit further comprises an additional auxiliary guide installed on the frame and is positioned in front of the pickup module, and
the additional auxiliary guide is configured to support one side of a third document in a width direction of the third document, the third document having a width that is smaller than the width of the second document.

9. The image scanning apparatus according to claim 1, wherein the auxiliary guide changes a rotation angle to place the auxiliary guide on an upper surface of the first document.

10. An image forming apparatus, comprising:
an image scanning apparatus comprising:
a scanning unit configured to scan a first document and a second document, the second document having a width that is smaller than a width of the first document; and
a document transfer unit configured to automatically feed the first document and the second document,
wherein the document transfer unit comprises:
a frame including a feed tray on which the first document and the second document are to be stacked;
a pickup module installed on the frame, and configured to pick up the first document and the second document from the feed tray; and
an auxiliary guide configured to change a position according to a height of the first document stacked on the feed tray, and to support one side of the second document in a width direction of the second document; and
an image forming unit configured to form the scanned first document and the scanned second document on one or more print mediums.

11. An image scanning apparatus, comprising:
a scanning unit configured to scan a first document and a second document, the second document having a width that is smaller than a width of the first document; and
a document transfer unit configured to automatically feed the first document and the second document,
wherein the document transfer unit comprises:
a frame including a feed tray on which the first document and the second document are to be stacked;
a cover unit rotatably coupled with the frame, and configured to be opened or closed;
a pickup module installed on the cover unit, and configured to pick up the first document and the second document from the feed tray; and
an auxiliary guide configured to change a position according to a height of the first document stacked on the feed tray, and to support one side of the second document in a width direction of the second document.

12. The image scanning apparatus according to claim 11, wherein
the cover unit further comprises a rail member provided at a lower part of the cover unit, and
the auxiliary guide is movably installed on the rail member to move along the rail member in a width direction of the feed tray.

13. The image scanning apparatus according to claim 12, wherein the rail member comprises at least one fixing member configured to fix the auxiliary guide at a position corresponding to the width of the second document.

14. The image scanning apparatus according to claim 11, wherein the document transfer unit further comprises an auxiliary guide transfer apparatus configured to automatically transfer the auxiliary guide to a position corresponding to the one side of the second document.

15. The image scanning apparatus according to claim 11, wherein the auxiliary guide comprises:
a support member supported on the cover unit,
a guide arm configured to support the one side of the second document, and
a rotating shaft configured to connect the support member to the guide arm and to change a rotation angle of the guide arm according to the height of the first document.

16. The image scanning apparatus according to claim 11, wherein at least one surface of the auxiliary guide has a round shape to prevent the second document from being jammed.

17. The image scanning apparatus according to claim 11, wherein
the document transfer unit further comprises an additional auxiliary guide installed on the cover unit and is positioned in front of the pickup module, and
the additional auxiliary guide is configured to support one side of a third document in a width direction of the third document, the third document having a width that is smaller than the width of the second document.

18. The image scanning apparatus according to claim 11, wherein the auxiliary guide changes a rotation angle to place the auxiliary guide on an upper surface of the first document.

19. The image scanning apparatus according to claim 12, wherein the cover unit further comprises a rail cover member configured to maintain the auxiliary guide on the rail member when the cover unit is opened.

20. An image forming apparatus, comprising:
an image scanning apparatus comprising:
a scanning unit configured to scan a first document and a second document, the second document having a width that is smaller than a width of the first document; and
a document transfer unit configured to automatically feed the first document and the second document,
wherein the document transfer unit comprises:

a frame including a feed tray on which the first document and the second document are to be stacked;
a cover unit rotatably coupled with the frame, and configured to be opened or closed;
a pickup module installed on the cover unit, and configured to pick up the first document and the second document from the feed tray; and
an auxiliary guide configured to change a position according to the height of the first document stacked on the feed tray, and to support one side of the second document in a width direction of the second document; and
an image forming unit configured to form the scanned first document and the scanned second document on one or more print mediums.

21. An image scanning apparatus, comprising:
a frame including a feed tray on which a first document and a second document are to be stacked, the second document having a width that is smaller than a width of the first document;
a cover unit rotatably coupled with the frame;
a pickup module configured to pick up the first document and the second document from the feed tray;
a scanning unit configured to scan the first document after the first document is transferred to the scanning unit from the pickup module, and to scan the second document after the second document is transferred to the scanning unit from the pickup module; and
at least one auxiliary guide configured to prevent a skew of the second document during the transfer of the second document from the pickup module to the scanning unit, and configured to change a position according to a height of the first document stacked on the feed tray, and the at least one auxiliary guide having a guide arm to support one side of the second document in a width direction of the second document.

22. The image scanning apparatus according to claim 21, further comprising a rail member installed on one of the frame and the cover unit,
wherein the at least one auxiliary guide is installed on the one of the frame and the cover unit and is movable along the rail member.

23. The image scanning apparatus according to claim 21, wherein a plurality of auxiliary guides which include the at least one auxiliary guide are arranged in a width direction of the feed tray.

24. The image scanning apparatus according to claim 21, further comprising an auxiliary guide transfer apparatus configured to automatically move the at least one auxiliary guide in a width direction of the feed tray.

25. The image scanning apparatus according to claim 21, wherein the guide arm is placed on an upper surface of the first document stacked on the feed tray, and rotates according to the height of the first document.

26. The image scanning apparatus according to claim 21, wherein the pickup module is installed on one of the frame and the cover unit and the at least one auxiliary guide is installed on the one of the frame and the cover unit.

27. The image scanning apparatus according to claim 22, further comprising an auxiliary guide transfer apparatus coupled to the rail member, and configured to automatically move the at least one auxiliary guide to a position corresponding to the one side of the second document.

28. The image scanning apparatus according to claim 27, wherein the auxiliary guide transfer apparatus comprises:
at least one sensor member disposed on the rail member, and configured to determine whether the at least one auxiliary guide is located at a position corresponding to the at least one sensor member,
at least one clip member connected to the at least one auxiliary guide,
a transfer member configured to transfer the clip member for moving the at least one auxiliary guide in the width direction of the second document, and
a driving member configured to move the transfer member according to the width of the second document.

29. An image scanning apparatus, comprising:
a feed tray configured to hold a first document having a first width and a second document having a second width which is less than the first width;
a pickup module configured to pick up the first document and the second document from the feed tray;
a scanning unit provided downstream of the pickup module along a scanning path of the first document and second document, and configured to scan the first document and the second document;
a movement guide configured to support both sides of the first document in a width direction of the first document, and configured to support one side of the second document in a width direction of the second document; and
an auxiliary guide provided upstream of the pickup module along the scanning path, and configured to support another side of the second document in a width direction of the second document.

30. The image scanning apparatus according to claim 29, further comprising a rail member which extends in the width direction of the second document,
wherein
the auxiliary guide is installed on the rail member to be moveable along the rail member so that the auxiliary guide is provided at a position corresponding to the another side of the second document, and
the auxiliary guide comprises:
a support member connected to the rail member,
a guide arm configured to support a side surface of the another side of the second document, and
a rotating shaft configured to connect the support member to the guide arm and to change a rotation angle of the guide arm according to a height of the first document so that an end of the guide arm contacts an upper surface of the first document held in the feed tray.

* * * * *